United States Patent
Suzuki et al.

(10) Patent No.: US 10,892,592 B2
(45) Date of Patent: Jan. 12, 2021

(54) LASER GAS PURIFYING SYSTEM AND LASER SYSTEM

(71) Applicant: Gigaphoton Inc., Tochigi (JP)

(72) Inventors: Natsushi Suzuki, Oyama (JP);
Masanori Yashiro, Oyama (JP);
Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/953,835

(22) Filed: Apr. 16, 2018

(65) Prior Publication Data

US 2018/0241170 A1 Aug. 23, 2018

Related U.S. Application Data

(63) Continuation of application No. PCT/JP2015/082012, filed on Nov. 13, 2015.

(51) Int. Cl.
*H01S 3/036* (2006.01)
*H01S 3/134* (2006.01)
*H01S 3/225* (2006.01)

(52) U.S. Cl.
CPC ............. *H01S 3/036* (2013.01); *H01S 3/134* (2013.01); *H01S 3/2251* (2013.01); *H01S 3/2256* (2013.01)

(58) Field of Classification Search
CPC ........ H01S 3/036; H01S 3/134; H01S 3/2251; H01S 3/2256
See application file for complete search history.

(56) References Cited

U.S. PATENT DOCUMENTS

| | | | |
|---|---|---|---|
| 4,958,356 A | 9/1990 | Tanuma | |
| 5,073,896 A | 12/1991 | Reid et al. | |
| 5,111,473 A | 5/1992 | Rebhan et al. | |
| 8,929,419 B1* | 1/2015 | Dean ...................... | H01S 3/036 372/57 |
| 9,478,934 B1* | 10/2016 | Donaldson .............. | H01S 3/134 |
| 2010/0086459 A1 | 4/2010 | Ikeda et al. | |
| 2013/0100980 A1* | 4/2013 | Abe ........................ | H01S 3/134 372/57 |

(Continued)

FOREIGN PATENT DOCUMENTS

| | | |
|---|---|---|
| CN | 102231469 A | 11/2011 |
| CN | 104332806 A | 2/2015 |

(Continued)

OTHER PUBLICATIONS

International Search Report issued in PCT/JP2015/082012; dated Feb. 9, 2016.

(Continued)

*Primary Examiner* — Yuanda Zhang
(74) *Attorney, Agent, or Firm* — Studebaker & Brackett PC

(57) ABSTRACT

A laser gas purifying system to purify laser gas emitted from a laser apparatus and return purified gas to the laser apparatus may include a first pipe configured to pass the laser gas emitted from the laser apparatus, a purifying apparatus connected to the first pipe and configured to purify the laser gas emitted from the laser apparatus, a second pipe connected to the purifying apparatus and configured to return the purified gas purified by the purifying apparatus to the laser apparatus, and an exhausting device provided in at least one of the first pipe, the purifying apparatus, and the second pipe.

8 Claims, 28 Drawing Sheets

(56) References Cited

U.S. PATENT DOCUMENTS

2016/0248215 A1    8/2016  Suzuki et al.
2017/0063016 A1*  3/2017  Vininski ............... H01S 3/2255
2018/0354795 A1*  12/2018  Suzuki .................. C01B 23/001

FOREIGN PATENT DOCUMENTS

| JP | H05-308170 A | 11/1993 |
|----|--------------|---------|
| JP | H06-283781 A | 10/1994 |
| JP | H07-106675 A | 4/1995 |
| JP | H11-054851 A | 2/1999 |
| JP | 2010-092920 A | 4/2010 |
| JP | 2017-080710 A | 5/2017 |
| WO | 2015/076415 A1 | 5/2015 |

OTHER PUBLICATIONS

International Preliminary Report on Patentability (Chapter I) and Translation of Written Opinion of the International Searching Authority; PCT/JP2015/082012; dated May 15, 2018.

An Office Action mailed by the State Intellectual Property Office of the People's Republic of China dated Oct. 23, 2019, which corresponds to Chinese Patent Application No. 201580083635.5 and is related to U.S. Appl. No. 15/953,835; with English language translation.

An Office Action mailed by the Japanese Patent Office dated Jan. 14, 2020, which corresponds to Japanese Patent No. 2017-549958 and is related to U.S. Appl. No. 15/953,835 with English language translation.

* cited by examiner

LASER GAS PURIFYING SYSTEM AND LASER SYSTEM

TECHNICAL FIELD

The present disclosure relates to a laser gas purifying system and a laser system.

BACKGROUND ART

The recent miniaturization and the increased levels of integration of semiconductor integrated circuits have led to a demand for increasing in a resolution of semiconductor exposure apparatuses. A semiconductor exposure apparatus is hereinafter referred to simply as "exposure apparatus". Accordingly, exposure light sources to emit light at shorter wavelengths have been under development. As the exposure light sources, gas laser apparatuses instead of conventional mercury lamps are typically used. The gas laser apparatuses for exposure include a KrF excimer laser apparatus that emits an ultraviolet laser beam at a wavelength of 248 nm and an ArF excimer laser apparatus that emits an ultraviolet laser beam at a wavelength of 193 nm.

As an advanced exposure technology, immersion exposure has been put into practical use. In the immersion exposure, a gap between an exposure lens and a wafer in an exposure apparatus is filled with a fluid such as water. The immersion exposure allows the refractive index of the gap to be changed and thus an apparent wavelength of the light from the exposure light source is shortened. The immersion exposure using an ArF excimer laser apparatus as an exposure light source allows a wafer to be irradiated with ultraviolet light having a wavelength in water of 134 nm. This technology is referred to as "ArF immersion exposure" or "ArF immersion lithography".

Spectral line widths of KrF and ArF excimer laser apparatuses in natural oscillation are as wide as approximately 350 pm to 400 pm. This may cause chromatic aberration by using exposure lenses that are made of a material that transmits ultraviolet light such as KrF and ArF laser beams. The chromatic aberration thus causes a reduction in resolution. Accordingly, the spectral line width of the laser beam outputted from the gas laser apparatus needs to be narrowed to such an extent that the chromatic aberration can be ignored. To narrow the spectral line width, a laser resonator of a gas laser apparatus may be equipped with a line narrow module (LNM) having a line narrow element. The line narrow element may be an etalon, a grating, or the like. A laser apparatus whose spectral line width is narrowed is hereinafter referred to as "line narrowed laser apparatus".

Patent Document 1: International Publication No. WO2015/075840 A
Patent Document 2: US Patent Application Publication No. 2010/0086459 A
Patent Document 3: U.S. Pat. No. 4,958,356 B
Patent Document 4: U.S. Pat. No. 5,111,473 B
Patent Document 5: Japanese Patent Application Publication No. H05-308170 A
Patent Document 6: Japanese Patent Application Publication No. H06-283781 A
Patent Document 7: Japanese Patent Application Publication No. H07-106675 A

SUMMARY

An aspect of the present disclosure may be related to a laser gas purifying system configured to purify laser gas emitted from a laser apparatus and return purified gas to the laser apparatus. The laser gas purifying system may include a first pipe configured to pass the laser gas emitted from the laser apparatus, a purifying apparatus connected to the first pipe and configured to purify the laser gas emitted from the laser apparatus, a second pipe connected to the purifying apparatus and configured to return the purified gas purified by the purifying apparatus to the laser apparatus, and an exhausting device provided in at least one of the first pipe, the purifying apparatus, and the second pipe.

Another aspect of the present disclosure may be related to a laser system including a laser apparatus and a laser gas purifying system. The laser gas purifying system may include a first pipe configured to pass laser gas emitted from the laser apparatus, a purifying apparatus connected to the first pipe and configured to purify the laser gas emitted from the laser apparatus, a second pipe connected to the purifying apparatus and configured to pass purified gas purified by the purifying apparatus, a third pipe connected to a gas cylinder storing laser gas, a first valve provided in the second pipe, a second valve provided in the third pipe, and a gas purification controller configured to control the purifying apparatus and the first and second valves. The laser apparatus may include a chamber, a gas supply pipe connected to both the second pipe and the third pipe and configured to supply the purified gas purified by the purifying apparatus and the laser gas supplied from the gas cylinder to the chamber, a third valve provided in the gas supply pipe, and a gas controller configured to control the third valve.

Another aspect of the present disclosure may be related to a laser system. The laser system may include a first chamber, a second chamber, a purifying apparatus configured to purify laser gas emitted from the first chamber and the second chamber, a first pipe connected to the purifying apparatus and configured to pass purified gas purified by the purifying apparatus, a second pipe connected to a gas cylinder storing laser gas and configured to pass the laser gas stored in the gas cylinder, a first branched pipe connected between the first pipe and the first chamber, a second branched pipe connected between the second pipe and the first chamber, a third branched pipe connected between the first pipe and the second chamber, a fourth branched pipe connected between the second pipe and the second chamber, and first to fourth valves provided in the first to fourth branched pipes, respectively.

BRIEF DESCRIPTION OF DRAWINGS

Embodiments of the present disclosure will be described below as mere examples with reference to the attached drawings.

DESCRIPTION OF EMBODIMENTS

Figure 1:
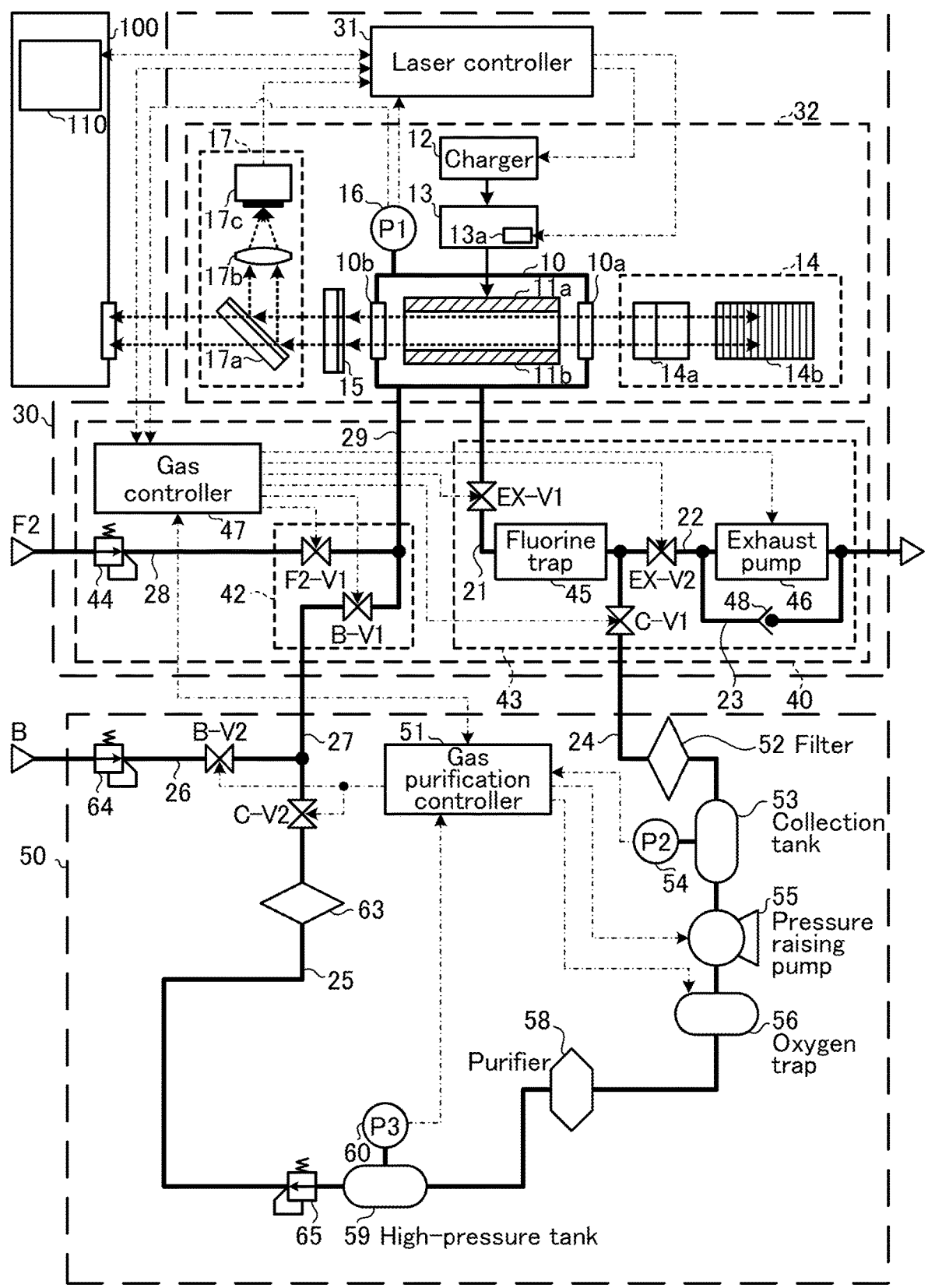
FIG. 1 schematically shows a configuration of a laser apparatus 30 and that of a laser gas purifying system 50 according to a comparative example.

Contents
1. Summary
2. Excimer Laser Apparatus and Laser Gas Purifying System of Comparative Example
   2.1 Configuration
      2.1.1 Excimer Laser Apparatus
         2.1.1.1 Laser Oscillation System
         2.1.1.2 Laser Gas Control System
      2.1.2 Laser Gas Purifying System
   2.2 Operation
      2.2.1 Operation of Excimer Laser Apparatus
         2.2.1.1 Operation of Laser Oscillation System
         2.2.1.2 Operation of Laser Gas Control System
      2.2.2 Operation of Laser Gas Purifying System
   2.3 Problem
3. Laser Gas Purifying System Including Exhausting Device
   3.1 Configuration
   3.2 Operation
   3.3 Process of Gas Purification Controller
   3.4 Supplementary Explanation
   3.5 Effect
   3.6 Modified Examples
      3.6.1 Exhausting Gas via Check Valve 78
      3.6.2 Exhausting Gas Based on Operating Time of Purifying Apparatus
      3.6.3 Exhausting Gas Based on Laser Parameters
4. Laser Gas Purifying System That Supplies New Gas
   4.1 Configuration
   4.2 Operation
   4.3 Process of Gas Purification Controller
   4.4 Effect
   4.5 Example to Suppress Increase in Pressure in High-Pressure Tank 59
5. ArF Excimer Laser Apparatus and Laser Gas Purifying System
   5.1 Configuration
   5.2 Operation
   5.3 Process of Gas Purification Controller
6. Laser Gas Purifying System That Performs Gas Purge
   6.1 Configuration
   6.2 Operation
7. Laser Gas Purifying System Connected to Plurality of Laser Apparatuses
   7.1 Configuration
   7.2 Operation
   7.3 Effect
8. Laser Gas Purifying System Capable of Changing Gas Supplied to Each Laser
   8.1 Configuration
   8.2 Operation
9. Configuration of Controller Embodiments of the present disclosure will be described in detail below with reference to the drawings. The embodiments described below show examples of the present disclosure and do not intend to limit the content of the present disclosure. Not all of the configurations and operations described in each embodiment are indispensable in the present disclosure. Identical reference symbols may be assigned to identical constituent elements and redundant descriptions thereof may be omitted.

1. Summary

An embodiment of the present disclosure may relate to a laser gas purifying system. The embodiment of the present disclosure may also relate to a laser system including the laser gas purifying system. The laser gas purifying system may be used with a laser apparatus. The laser apparatus may be a discharge-excited gas laser apparatus. The discharge-excited gas laser apparatus may be configured such that a predetermined voltage is applied to a pair of electrodes provided in a chamber to cause an electric discharge to excite laser gas in the chamber.

The discharge-excited gas laser apparatus in the embodiment of the present disclosure may be an excimer laser apparatus. The laser gas used in the excimer laser apparatus may include rare gas and halogen gas. Laser oscillation of the excimer laser apparatus for a long time may cause impurities to be generated in the laser gas in the chamber of the laser apparatus. The impurities in the laser gas may include, for example, halogen compounds. The impurities generated in the laser gas may absorb a part of the pulse laser beam or worsen a condition of the electric discharge. The impurities generated in the laser gas may thus make it difficult or impossible to output the pulse laser beam having desired energy.

For outputting a pulse laser beam having desired energy, a purifying apparatus has been proposed. The purifying apparatus reduces impurities in emission gas emitted from the chamber and returns purified gas with a reduced amount of impurities to the chamber. The purifying apparatus may include a trap and the like to adsorb impurities. The purified gas returned from the purifying apparatus to the chamber may mainly include the rare gas. The purified gas may be mixed with newly supplied halogen gas and then be supplied to the chamber. The performance of the laser may thus be stabilized.

The laser gas exhausted from the chamber may include various impurities. The various impurities may include miscellaneous impurities that are not removed by the purifying apparatus. The miscellaneous impurities that are not removed by the purifying apparatus may not immediately influence the performance of the laser. However, repetition of emitting the laser gas from the chamber and returning the purified gas to the chamber may cause the miscellaneous impurities that are not removed by the purifying apparatus to be accumulated in the laser gas. This may influence the performance of the laser.

The laser gas purifying system according to the embodiment of the present disclosure may include a first pipe to supply laser gas exhausted from the laser apparatus, a purifying apparatus connected to the first pipe to purify the laser gas exhausted from the laser apparatus, a second pipe connected to the purifying apparatus to return the laser gas purified in the purifying apparatus to the laser apparatus, and an exhausting device equipped with at least one of the first pipe, the purifying apparatus, and the second pipe. The exhausting device may exhaust the gas in the laser gas purifying system. This may suppress accumulation of the impurities that are not removed by the purifying apparatus.

2. Excimer Laser Apparatus and Laser Gas Purifying System of Comparative Example 2.1 Configuration FIG. 1 schematically shows a configuration of a laser apparatus 30 and that of a laser gas purifying system 50 according to a comparative example.

2.1.1 Excimer Laser Apparatus

The laser apparatus 30 may include a laser controller 31, a laser oscillation system 32, and a laser gas control system 40.

The laser apparatus 30 may be used with an exposure apparatus 100. A laser beam outputted from the laser apparatus 30 may enter the exposure apparatus 100. The exposure apparatus 100 may include an exposure apparatus controller 110. The exposure apparatus controller 110 may be configured to control the exposure apparatus 100. The exposure apparatus controller 110 may be configured to send a setting signal of a target value of pulse energy and an oscillation trigger signal to the laser controller 31 in the laser apparatus 30.

The laser controller 31 may be configured to control the laser oscillation system 32 and the laser gas control system 40. The laser controller 31 may receive measured data from a power monitor 17 and a chamber pressure sensor 16 each included in the laser oscillation system 32.

2.1.1.1 Laser Oscillation System

The laser oscillation system 32 may include a chamber 10, a charger 12, a pulse power module 13, a line narrow module 14, an output coupling mirror 15, the chamber pressure sensor 16, and the power monitor 17.

The chamber 10 may be provided in an optical path in a laser resonator configured by the line narrow module 14 and the output coupling mirror 15. The chamber 10 may have two windows 10a and 10b. The chamber 10 may accommodate a pair of discharge electrodes 11a and 11b. The chamber 10 may accommodate the laser gas.

The charger 12 may hold electric energy to be supplied to the pulse power module 13. The pulse power module 13 may include a switch 13a. The pulse power module 13 may be configured to apply a pulsed voltage to the pair of discharge electrodes 11a and 11b.

The line narrow module 14 may include a prism 14a and a grating 14b. The output coupling mirror 15 may be a partially reflective mirror.

The chamber pressure sensor 16 may be configured to measure the pressure of the laser gas in the chamber 10. The pressure of the laser gas measured by the chamber pressure sensor 16 may be a total pressure of the laser gas. The chamber pressure sensor 16 may be configured to send the measured data on the pressure to the laser controller 31 and to a gas controller 47 included in the laser gas control system 40.

The power monitor 17 may include a beam splitter 17a, a focusing lens 17b, and an optical sensor 17c. The beam splitter 17a may be provided in the optical path of the laser beam outputted from the output coupling mirror 15. The beam splitter 17a may be configured to transmit a part of the laser beam outputted from the output coupling mirror 15 to the exposure apparatus 100 at a high transmittance and reflect another part thereof. The focusing lens 17b and the optical sensor 17c may be provided in the optical path of the laser beam reflected by the beam splitter 17a. The focusing lens 17b may be configured to concentrate the laser beam reflected by the beam splitter 17a on the optical sensor 17c. The optical sensor 17c may be configured to send an electric signal according to the pulse energy of the laser beam concentrated by the focusing lens 17b as measured data to the laser controller 31.

2.1.1.2 Laser Gas Control System

The laser gas control system 40 may include the gas controller 47, a gas supply device 42, and an exhausting device 43. The gas controller 47 may send and receive signals to and from the laser controller 31. The gas controller 47 may receive the measured data outputted from the chamber pressure sensor 16 in the laser oscillation system 32. The gas controller 47 may be configured to control the gas supply device 42 and the exhausting device 43. The gas controller 47 may also be configured to control valves F2-V1 and B-V1 each included in the gas supply device 42 and valves EX-V1, EX-V2, C-V1, and an exhaust pump 46 each included in the exhausting device 43.

The gas supply device 42 may include a part of a pipe 28 connected to a fluorine-containing gas supply source F2 and a part of a pipe 29 connected to the chamber 10 in the laser oscillation system 32. Connecting the pipe 28 to the pipe 29 may allow the fluorine-containing gas supply source F2 to supply the fluorine-containing gas to the chamber 10. The fluorine-containing gas supply source F2 may be a gas cylinder that stores the fluorine-containing gas. If the laser apparatus 30 is a KrF excimer laser apparatus, the fluorine-containing gas may be a laser gas where fluorine gas, krypton gas, and neon gas are mixed. Supply pressure of the laser gas from the fluorine-containing gas supply source F2 to the pipe 28 may be adjusted by a regulator 44. The gas supply device 42 may include the valve F2-V1 provided in the pipe 28. Supplying the fluorine-containing gas from the fluorine-containing gas supply source F2 via the pipe 29 to the chamber 10 may be controlled by opening and closing the valve F2-V1. Opening and closing of the valve F2-V1 may be controlled by the gas controller 47.

The gas supply device 42 may further include a part of a pipe 27 connected between the laser gas purifying system 50 and the pipe 29. Connecting the pipe 27 to the pipe 29 may allow the laser gas purifying system 50 to supply buffer gas to the chamber 10. If the laser apparatus 30 is the KrF excimer laser apparatus, the buffer gas may be a laser gas including the krypton gas and the neon gas. The buffer gas may be new gas that is supplied by a buffer gas supply source B described below or purified gas where impurities are reduced by the laser gas purifying system 50. The gas supply device 42 may include the valve B-V1 provided in the pipe 27. Supplying the buffer gas from the laser gas purifying system 50 via the pipe 29 to the chamber 10 may be controlled by opening and closing the valve B-V1. Opening and closing of the valve B-V1 may be controlled by the gas controller 47.

The exhausting device 43 may include a part of a pipe 21 connected to the chamber 10 in the laser oscillation system 32 and a part of a pipe 22 connected to an unillustrated exhaust gas treating device or the like provided at outside of the exhausting device 43. Connecting the pipe 21 to the pipe 22 may allow emission gas emitted from the chamber 10 to be exhausted to the outside of the exhausting device 43.

The exhausting device 43 may further include the valve EX-V1 and a fluorine trap 45 each provided in the pipe 21. The valve EX-V1 and the fluorine trap 45 may be arranged in this order from a position near the chamber 10. Supplying the emission gas from the chamber 10 to the fluorine trap 45 may be controlled by opening and closing the valve EX-V1. Opening and closing of the valve EX-V1 may be controlled by the gas controller 47.

The fluorine trap 45 may be configured to catch fluorine gas and fluorine compounds included in the emission gas emitted from the chamber 10. Treating agents to catch the fluorine gas and the fluorine compound may include, for example, a combination of zeolite and calcium oxide. The fluorine gas and the calcium oxide may react to form calcium fluoride and oxygen gas. The calcium fluoride may be adsorbed to the zeolite. The oxygen gas may be caught by an oxygen trap 56 described below.

The exhausting device 43 may include the valve EX-V2 and the exhaust pump 46 each provided in the pipe 22. The valve EX-V2 may be arranged nearer to the chamber 10 than the exhaust pump 46. Exhausting the emission gas from an outlet of the fluorine trap 45 to the outside of the exhausting device 43 may be controlled by opening and closing the valve EX-V2. Opening and closing of the valve EX-V2 may be controlled by the gas controller 47. When the valves EX-V1 and EX-V2 are open, the exhaust pump 46 may forcibly exhaust laser gas in the chamber 10 until the pressure is equal to or lower than the atmospheric pressure. Operation of the exhaust pump 46 may be controlled by the gas controller 47. The exhaust pump 46 may be replaced by a vacuum generator. The vacuum generator may emit a jet of working gas such as nitrogen or air via a nozzle to cause fluid in the vicinity of the nozzle to be sucked to reduce pressure of the fluid.

The exhausting device 43 may further include a bypass pipe 23 connected between the pipe 22 connected to an inlet of the exhaust pump 46 and the pipe 22 connected to an outlet of the exhaust pump 46. The exhausting device 43 may further include a check valve 48 provided in the bypass pipe 23. A part of the laser gas in the chamber 10 at a pressure equal to or higher than the atmospheric pressure may be exhausted via the check valve 48 until the pressure is substantially equal to the atmospheric pressure if the valves EX-V1 and EX-V2 are open.

The exhausting device 43 may further include a part of a pipe 24. The pipe 24 may be connected between the laser gas purifying system 50 and a connecting portion connecting the pipes 21 and 22. Connecting the pipe 24 to the portion connecting the pipes 21 and 22 may allow the emission gas emitted from the chamber 10 to be supplied to the laser gas purifying system 50. The exhausting device 43 may further include the valve C-V1 provided in the pipe 24. Supplying the emission gas from the outlet of the fluorine trap 45 to the laser gas purifying system 50 may be controlled by opening and closing the valve C-V1. Opening and closing of the valve C-V1 may be controlled by the gas controller 47.

2.1.2 Laser Gas Purifying System

The laser gas purifying system 50 may include a gas purification controller 51. The gas purification controller 51 may send and receive signals to and from the gas controller 47 in the laser gas control system 40. The gas purification controller 51 may be configured to control each constituent element of the laser gas purifying system 50.

The laser gas purifying system 50 may include a part of the pipe 24 connected to the exhausting device 43 of the laser gas control system 40, a part of the pipe 27 connected to the gas supply device 42 of the laser gas control system 40, and a pipe 25 connected to a connecting portion connecting the pipes 24 and 27.

A purifying apparatus described below may be provided in the pipes 24 and 25. In the pipe 24, a filter 52, a collection tank 53, a pressure raising pump 55, the oxygen trap 56, and a purifier 58 may be arranged in this order from a position near the exhausting device 43. In the pipe 25, a high-pressure tank 59, a regulator 65, a filter 63, and a valve C-V2 may be arranged in this order from a position near the purifier 58. The pipe 24 and the pipe 25 may configure a gas purification flow path from the valve C-V1 to the valve C-V2.

The laser gas purifying system 50 may further include a part of a pipe 26 connected to the buffer gas supply source B. The pipe 26 may be connected to a connecting portion connecting the pipes 25 and 27. The buffer gas supply source B may be a gas cylinder that stores buffer gas. In the present disclosure, buffer gas supplied from the buffer gas supply source B and have not reached the chamber 10 may be referred to as "new gas", in contrast to the purified gas supplied from the pipes 24 and 25. Supply pressure of the new gas from the buffer gas supply source B to the pipe 26 may be adjusted by a regulator 64. The laser gas purifying system 50 may include a valve B-V2 provided in the pipe 26.

The filter 52 included in the laser gas purifying system 50 may catch particles included in the emission gas.

The collection tank 53 may be a container to store the emission gas. A pressure sensor 54 may be equipped with the collection tank 53. The pressure sensor 54 may be configured to send measured data on the pressure in the collection tank 53 to the gas purification controller 51.

The pressure raising pump 55 may be configured to raise the pressure of the emission gas and output the emission gas. The pressure raising pump 55 may be a diaphragm pump, which may generate little oil contaminant. The pressure raising pump 55 may be controlled by the gas purification controller 51.

The oxygen trap 56 may be configured to catch the oxygen gas. Treating agent to catch the oxygen gas may include at least one of nickel-based (Ni-based) catalyst, copper-based (Cu-based) catalyst, and a composite thereof. The oxygen trap 56 may include an unillustrated heating device and an unillustrated temperature regulator. The heating device and the temperature regulator of the oxygen trap 56 may be controlled by the gas purification controller 51.

The purifier 58 may be a metal filter including metal getter. The metal getter may be zirconium-based (Zr-based) alloy. The purifier 58 may be configured to trap gaseous impurities from the laser gas.

The high-pressure tank 59 provided in the pipe 25 may be a container to store the purified gas that has passed through the flow path from the fluorine trap 45 to the purifier 58. A pressure sensor 60 may be equipped with the high-pressure tank 59. The pressure sensor 60 may be configured to send measured data on the pressure in the high-pressure tank 59 to the gas purification controller 51.

The regulator 65 may be a pressure-reducing valve to regulate the pressure of the purified gas to a predetermined value.

The filter 63 may catch particles from the purified gas.

2.2 Operation
2.2.1 Operation of Excimer Laser Apparatus
2.2.1.1 Operation of Laser Oscillation System The laser controller 31 may receive the setting signal of the target value of pulse energy and the oscillation trigger signal from the exposure apparatus controller 110. The laser controller 31 may send a setting signal of charging voltage to the charger 12 based on the setting signal of the target value of pulse energy received from the exposure apparatus controller 110. The laser controller 31 may also send an oscillation trigger to the switch 13a in the pulse power module (PPM) 13 based on the oscillation trigger signal received from the exposure apparatus controller 110.

The switch 13a in the pulse power module 13 may turn ON upon receiving the oscillation trigger from the laser controller 31. The pulse power module 13 where the switch 13a has turned ON may generate a pulsed high voltage from the electric energy charged in the charger 12 and apply the high voltage to the pair of discharge electrodes 11a and 11b.

The high voltage applied to the pair of discharge electrodes 11a and 11b may cause an electric discharge between the pair of discharge electrodes 11a and 11b. The energy of the electric discharge may excite the laser gas in the chamber 10 and the laser gas may shift to a high energy level. The excited laser gas may then shift back to a low energy level to emit light having a wavelength according to the difference in the energy levels.

The light generated in the chamber 10 may be emitted via the windows 10a and 10b to the outside of the chamber 10. The light emitted from the chamber 10 via the window 10a may be beam-expanded by the prism 14a and be incident on the grating 14b. The light incident on the grating 14b from the prism 14a may be reflected by a plurality of grooves of the grating 14b, being diffracted in directions according to the wavelengths of the light. The grating 14b may be in a Littrow arrangement such that an angle of incidence of the light incident on the grating 14b from the prism 14a and an angle of diffraction of diffracted light having a desired wavelength coincide with each other. The light around the desired wavelength may thus return via the prism 14a to the chamber 10.

The output coupling mirror 15 may transmit and output a part of the light emitted from the window 10b of the chamber 10 and reflect and return another part of the light to the chamber 10.

The light emitted from the chamber 10 may thus reciprocate between the line narrow module 14 and the output coupling mirror 15. The light may be amplified each time it passes through the electric discharge space between the pair of discharge electrodes 11a and 11b, which causes laser oscillation. The light may be narrow-banded each time it is returned by the line narrow module 14. The light thus amplified and narrow-banded may be outputted from the output coupling mirror 15 as the laser beam.

The power monitor 17 may detect the pulse energy of the laser beam outputted from the output coupling mirror 15. The power monitor 17 may send the data on the detected pulse energy to the laser controller 31.

The laser controller 31 may perform feedback control of the charging voltage to be set to the charger 12. The feedback control may be based on the measured data on the pulse energy received from the power monitor 17 and the setting signal of the target value of pulse energy received from the exposure apparatus controller 110.

2.2.1.2 Operation of Laser Gas Control System

Figure 2:
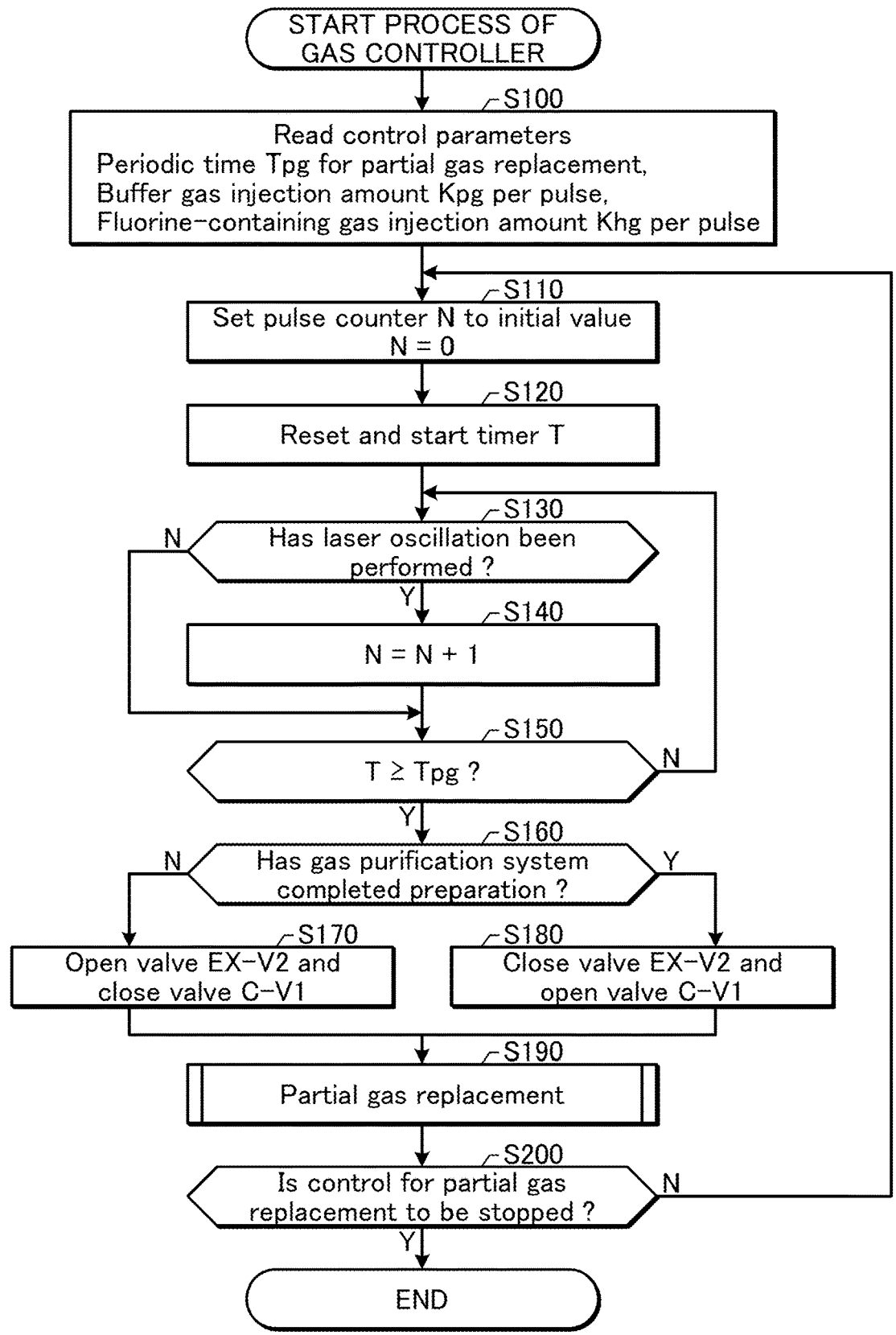
FIG. 2 is a flowchart showing a process of a gas controller 47 of the laser apparatus 30 according to the comparative example.

FIG. 2 is a flowchart showing a process of the gas controller 47 of the laser apparatus 30 according to the comparative example. The laser gas control system 40 of the laser apparatus 30 may perform a partial gas replacement in the process described below executed by the gas controller 47.

First, at S100, the gas controller 47 may read various control parameters. The control parameters may include, for example, a periodic time Tpg for the partial gas replacement, a buffer gas injection amount Kpg per pulse, and a fluorine-containing gas injection amount Khg per pulse.

Next, at S110, the gas controller 47 may set a pulse counter N to an initial value 0.

Next, at S120, the gas controller 47 may reset and start a timer T, to be used for determining expiration of the periodic time for the partial gas replacement.

Next, at S130, the gas controller 47 may determine whether laser oscillation has been performed. Whether the laser oscillation has been performed may be determined by receiving the oscillation trigger from the laser controller 31 or receiving the data measured by the power monitor 17 from the laser controller 31.

If the laser oscillation has been performed (S130: YES), the gas controller 47 may add 1 to the value of the pulse counter N at S140 to update the value of N, and proceed to S150. If the laser oscillation has not been performed in a predetermined period of time (S130: NO), the gas controller 47 may skip S140 to proceed to S150.

At S150, the gas controller 47 may determine whether the value of the timer T has reached the periodic time Tpg for the partial gas replacement. If the value of the timer T has reached the periodic time Tpg (S150: YES), the gas controller 47 may proceed to S160. If the value of the timer T has not reached the periodic time Tpg (S150: NO), the gas controller 47 may return to S130 to repeat the sequence of updating the number of pulses and determining the periodic time Tpg.

At S160, the gas controller 47 may determine whether the laser gas purifying system has completed its preparation. The determination may be made based on a signal to show completion of preparation for gas purification or a signal to show suspension of gas purification, whichever is received from the gas purification controller 51. The gas controller 47 may select, according to the determination, one of the following controls: a first control to close the valve C-V1 and open the EX-V2, and a second control to close the valve EX-V2 and open the valve C-V1. Namely, if the laser gas purifying system has not completed its preparation (S160: NO), the gas controller 47 may perform the first control described above at S170 and proceed to S190. If the laser gas purifying system has completed its preparation (S160: YES), the gas controller 47 may perform the second control described above at S180 and proceed to S190.

At S190, the gas controller 47 may execute the partial gas replacement. Details of the process of S190 are described below with reference to FIG. 3.

After executing the partial gas replacement, the gas controller 47 may determine at S200 whether the control for the partial gas replacement is to be stopped. If the control for the partial gas replacement is to be stopped (S200: YES), the gas controller 47 may end the process of this flowchart. If the control for the partial gas replacement is not to be stopped (S200: NO), the gas controller 47 may return to S110 described above. The gas controller 47 may then reset the pulse counter N and the timer T to re-start counting the number of pulses to determine the periodic time Tpg.

Figure 3:
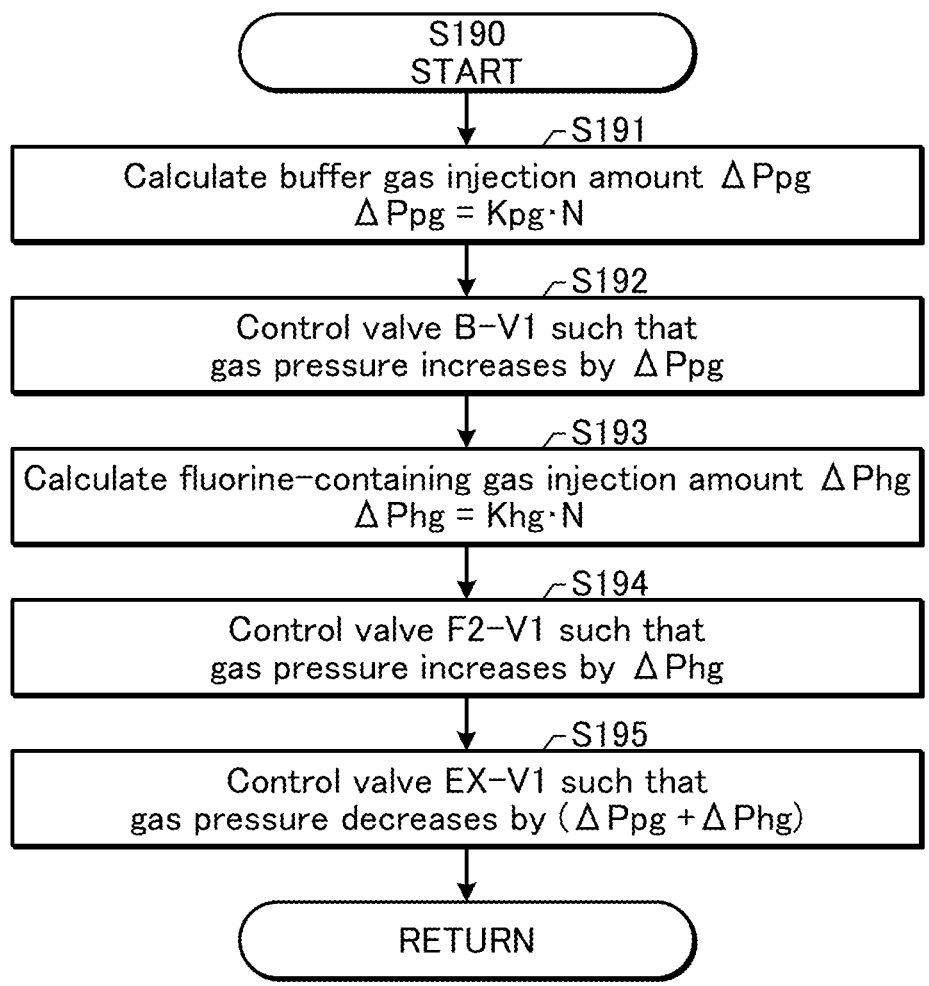
FIG. 3 is a flowchart showing details of a process of S190 shown in FIG. 2.

FIG. 3 is a flowchart showing the details of the process of S190 shown in FIG. 2. The gas controller 47 may execute the partial gas replacement as described below.

First, at S191, the gas controller 47 may calculate a buffer gas injection amount $\Delta Ppg$ by the following formula.

$$\Delta Ppg = Kpg \cdot N$$

Here, Kpg is the buffer gas injection amount per pulse described above. N is the value of the pulse counter.

Next, at S192, the gas controller 47 may open the valve B-V1 to inject the buffer gas supplied from the laser gas purifying system 50 into the chamber 10. The buffer gas supplied from the laser gas purifying system 50 may be the new gas supplied from the buffer gas supply source B via the valve B-V2 or the purified gas where impurities are reduced in the laser gas purifying system 50 and supplied via the valve C-V2.

The gas controller 47 may receive the measured data from the chamber pressure sensor 16. If an amount of increase in pressure of the laser gas in the chamber 10 has reached an amount of increase corresponding to the buffer gas injection amount $\Delta Ppg$, the gas controller 47 may close the valve B-V1.

Next, at S193, the gas controller 47 may calculate a fluorine-containing gas injection amount $\Delta Phg$ by the following formula.

$$\Delta Phg = Khg \cdot N$$

Here, Khg may be the fluorine-containing gas injection amount per pulse described above.

Next, at S194, the gas controller 47 may open the valve F2-V1 to inject the fluorine-containing gas supplied from the fluorine-containing gas supply source F2 into the chamber 10.

The gas controller 47 may receive the measured data from the chamber pressure sensor 16. If an amount of increase in pressure of the laser gas in the chamber 10 has reached an amount of increase corresponding to the fluorine-containing gas injection amount $\Delta Phg$, the gas controller 47 may close the valve F2-V1.

Next, at S195, the gas controller 47 may open and close the valve EX-V1 to emit a part of the laser gas in the chamber 10 to the exhausting device 43. If the gas controller 47 has recently performed the first control in S170 described above, the emission gas emitted from the chamber 10 to the exhausting device 43 may be exhausted via the valve EX-V2 to the outside of the exhausting device 43. If the gas controller 47 has recently performed the second control at S180 described above, the emission gas emitted from the chamber 10 to the exhausting device 43 may be supplied via the valve C-V1 to the laser gas purifying system 50.

The gas controller 47 may receive the measured data from the chamber pressure sensor 16. The gas controller 47 may repeat opening and closing of the valve EX-V1 until an amount of decrease in pressure of the laser gas in the chamber 10 reaches an amount of decrease corresponding to the sum of the buffer gas injection amount $\Delta Ppg$ and the fluorine-containing gas injection amount $\Delta Phg$.

After S195, the gas controller 47 may end the process of this flowchart and return to the process shown in FIG. 2.

In the partial gas replacement described above, a predetermined amount of gas with a reduced amount of impurities may be supplied to the chamber 10 and an amount of gas equivalent to the predetermined amount may be exhausted from the chamber 10.

Impurities in the chamber 10 such as hydrogen fluoride (HF), tetrafluoromethane ($CF_4$), silicon tetrafluoride ($SiF_4$), nitrogen trifluoride ($NF_3$), and hexafluoroethane ($C_2F_6$) may thus be reduced.

2.2.2 Operation of Laser Gas Purifying System

The filter 52 may catch particles generated by the electric discharge in the chamber 10 and included in the emission gas passed through the fluorine trap 45.

The collection tank 53 may store the emission gas passed through the filter 52. The pressure sensor 54 may measure the pressure in the collection tank 53. The pressure sensor 54 may send data on the measured gas pressure to the gas purification controller 51.

The pressure raising pump 55 may raise the pressure of the emission gas from the collection tank 53 to output the emission gas to the oxygen trap 56. While the value of the pressure in the collection tank 53 received from the pressure sensor 54 is equal to or higher than the atmospheric pressure, the gas purification controller 51 may keep the pressure raising pump 55 driven.

The oxygen trap 56 may catch the oxygen gas generated in the fluorine trap 45 by the reaction of the fluorine gas and the calcium oxide.

The purifier 58 may trap gaseous impurities such as a small amount of water vapor, oxygen gas, carbon monoxide gas, carbon dioxide gas, nitrogen gas, or the like in the emission gas passed through the oxygen trap 56.

The high-pressure tank 59 may store the purified gas passed through the purifier 58. The pressure sensor 60 may measure the pressure in the high-pressure tank 59. The pressure sensor 60 may send data on the measured gas pressure to the gas purification controller 51.

The regulator 65 may reduce the pressure of the purified gas supplied from the high-pressure tank 59 to the predetermined value.

The filter 63 may catch particles generated in the laser gas purifying system 50 and included in the purified gas supplied from the regulator 65.

Supplying the purified gas from the gas purification flow path via the pipe 27 to the gas supply device 42 may be controlled by opening and closing the valve C-V2. Opening and closing of the valve C-V2 may be controlled by the gas purification controller 51.

Supplying the new gas from the buffer gas supply source B via the pipe 27 to the gas supply device 42 may be controlled by opening and closing the valve B-V2. Opening and closing of the valve B-V2 may be controlled by the gas purification controller 51.

The gas purification controller 51 may select one of the following controls: closing the valve C-V2 and opening the valve B-V2, and closing the valve B-V2 and opening the valve C-V2.

2.3 Problem

As described above, the laser gas exhausted from the chamber may include various impurities. The various impurities may include miscellaneous impurities that are not removed by the purifying apparatus. The miscellaneous impurities that are not removed by the purifying apparatus may not immediately influence the performance of the laser.

However, repetition of emitting the laser gas from the chamber and returning the purified gas to the chamber may cause the miscellaneous impurities that are not removed by the purifying apparatus to be accumulated in the laser gas. This may influence the performance of the laser. However, removing the miscellaneous impurities may require separate traps and the like for the respective impurities, causing the purifying apparatus to be large-sized. Further, it may be difficult to identify each of the miscellaneous impurities.

The embodiments described below may include an exhausting device to exhaust the gas in the laser gas purifying system. Exhausting the gas in the laser gas purifying system with the exhausting device may suppress accumulation of the impurities that are not removed by the laser gas purifying system 50. "Removing" impurities in the present disclosure may not necessarily mean reducing the concentration of the impurities to 0. It may mean reducing the concentration of the impurities to some extent.

3. Laser Gas Purifying System Including Exhausting Device

3.1 Configuration

Figure 4:
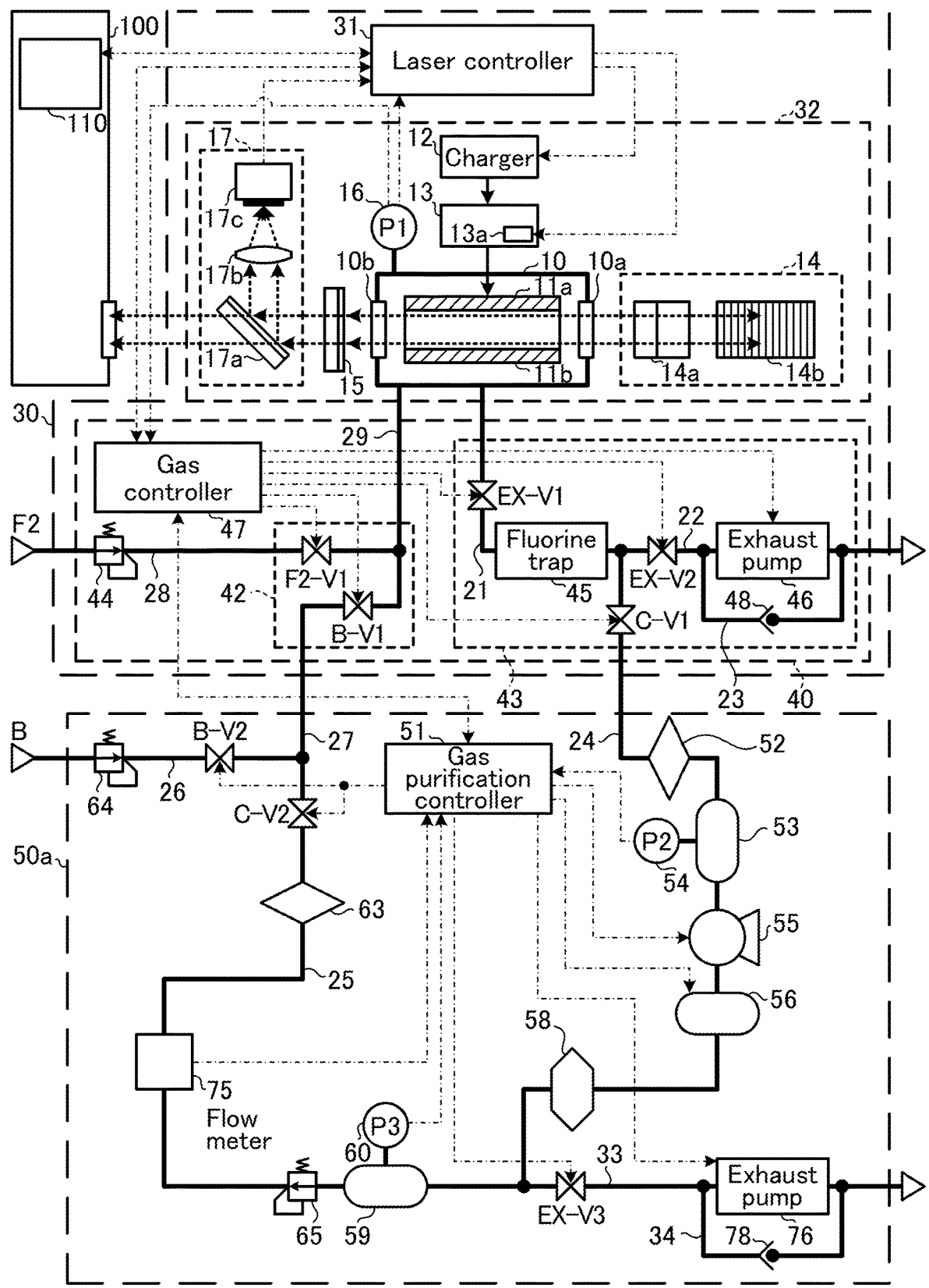
FIG. 4 schematically shows a configuration of a laser apparatus 30 and that of a laser gas purifying system 50a according to a first embodiment of the present disclosure.

FIG. 4 schematically shows a configuration of a laser apparatus 30 and that of a laser gas purifying system 50a according to the first embodiment of the present disclosure. The laser gas purifying system 50a in the first embodiment may include a pipe 33, a bypass pipe 34, a valve EX-V3, an exhaust pump 76, a check valve 78, and a flow meter 75.

The pipe 33 may be connected to a connecting portion connecting the pipe 24 accompanied by the purifier 58 and the pipe 25 accompanied by the high-pressure tank 59. The valve EX-V3 and the exhaust pump 76 may be arranged in this order in the pipe 33 from a position near the purifier 58.

The bypass pipe 34 may be connected between the pipe 33 connected to the inlet of the exhaust pump 76 and the pipe 33 connected to the outlet of the exhaust pump 76. The check valve 78 may be provided in the bypass pipe 34.

The flow meter 75 may be provided between the regulator 65 and the filter 63 in the pipe 25.

In other aspects, the first embodiment may have substantially the same configuration as the comparative example described above with reference to FIG. 1.

3.2 Operation

The gas purification controller 51 may control opening and closing of the valve EX-V3. A part of the laser gas in the gas purification flow path including the pipe 24 at a pressure equal to or higher than the atmospheric pressure may be exhausted via the check valve 78 until the pressure is substantially equal to the atmospheric pressure if the valve EX-V3 is open.

The gas purification controller 51 may control the exhaust pump 76. When the valve EX-V3 is open, the exhaust pump 76 may forcibly exhaust a part of the laser gas in the gas purification flow path including the pipe 24 until the pressure is equal to or lower than the atmospheric pressure.

The flow meter 75 may measure the flow rate Q of the gas in the pipe 25 and send the measured data on the flow rate Q to the gas purification controller 51.

3.3 Process of Gas Purification Controller

Figure 5:
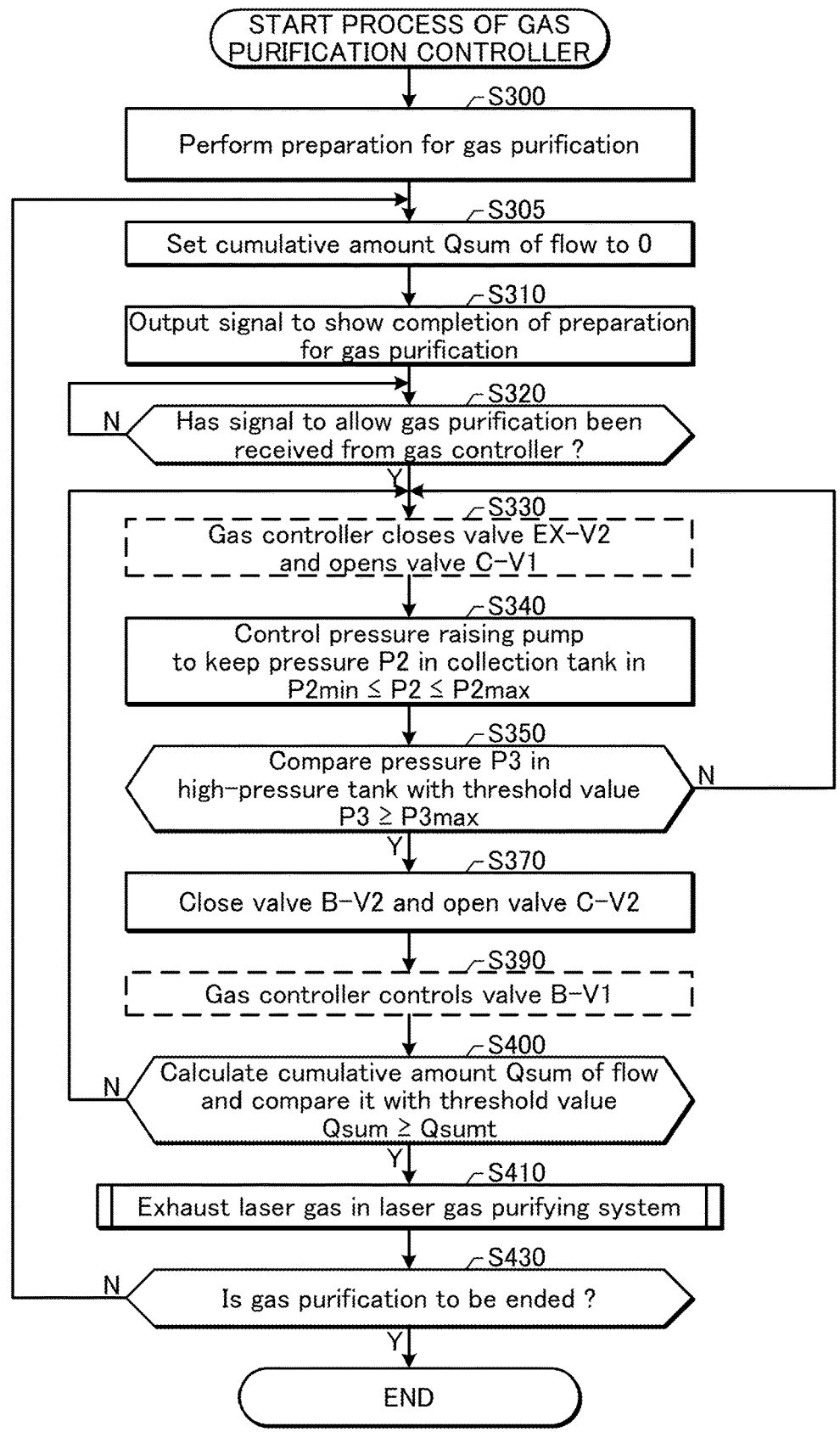
FIG. 5 is a flowchart showing a process of a gas purification controller 51 of the laser gas purifying system 50a according to the first embodiment.

FIG. 5 is a flowchart showing a process of the gas purification controller 51 of the laser gas purifying system 50a according to the first embodiment. The laser gas purifying system 50a may perform the gas purification in the process described below executed by the gas purification controller 51. In addition to the gas purification shown in FIG. 5, the partial gas replacement described with reference to FIGS. 2 and 3 may also be performed in the first embodiment by the gas controller 47.

First, at S300, the gas purification controller 51 may perform the preparation for gas purification. Here, the valve C-V2 may be kept closed and the valve B-V2 may be kept open. Until the gas purification controller 51 outputs the signal to show completion of preparation for gas purification described below, the gas controller 47 may keep the valve C-V1 closed. The preparation for gas purification may include, for example, filling the pipes and the tanks in the laser gas purifying system 50a with laser gas or exhausting gas by the exhaust pump 76 until the pressure is equal to or lower than the atmospheric pressure. The preparation for gas purification may further include heating the oxygen trap 56 to an optimum temperature to accelerate the oxygen adsorption.

After completing the preparation for gas purification, the gas purification controller 51 may set at S305 the value of a cumulative amount Qsum of flow of the laser gas to an initial value 0.

Next, at S310, the gas purification controller 51 may output the signal to show completion of preparation for gas purification to the gas controller 47.

Next, at S320, the gas purification controller 51 may determine whether it has received a signal to allow gas purification from the gas controller 47. The gas purification controller 51 may wait until receiving the signal to allow gas purification from the gas controller 47.

The gas controller 47 may output the signal to allow gas purification and then close the valve EX-V2 and open the valve C-V1 (S330) in the process of S180 in FIG. 2. Thus, the emission gas emitted from the chamber 10 to the exhausting device 43 may flow into the laser gas purifying system 50a.

Next, at S340, the gas purification controller 51 may control the pressure raising pump 55 to keep the pressure P2 in the collection tank 53 in the following range.

$$P2\min \leq P2 \leq P2\max$$

P2min may be, for example, a value equivalent to the atmospheric pressure. P2max may be a value higher than the atmospheric pressure.

Next, at S350, the gas purification controller 51 may compare the pressure P3 in the high-pressure tank 59 with a threshold value P3max. The threshold value P3max may be higher than the pressure in the chamber 10. The threshold value P3max may be equivalent to the pressure of the regulator 64 for the buffer gas supply source B.

If the pressure P3 in the high-pressure tank 59 is lower than the threshold value P3max (S350: NO), the gas purification controller 51 may return to S330 to continue driving the pressure raising pump 55 in S340. Control of the valves EX-V2 and C-V1 at S330 may be kept unchanged. If the pressure P3 in the high-pressure tank 59 is equal to or higher than the threshold value P3max (S350: YES), the gas purification controller 51 may proceed to S370.

At S370, the gas purification controller 51 may close the valve B-V2 and open the valve C-V2. Instead of the new gas from the buffer gas supply source B, the purified gas where impurities are reduced in the laser gas purifying system 50a may thus be supplied to the laser apparatus 30.

The gas controller 47 may then control the valve B-V1 (S390) in the process of S192 in FIG. 3. If the process of S192 in FIG. 3 is performed after S370, the purified gas may be supplied via the valve C-V2 to the laser apparatus 30. If the process of S192 in FIG. 3 is performed before S370, the new gas may be supplied via the valve B-V2 to the laser apparatus 30.

Next, at S400, the gas purification controller 51 may calculate the cumulative amount Qsum of flow of the purified gas in the pipe 25. The cumulative amount Qsum of flow may be calculated by time-integrating the flow rate Q received from the flow meter 75. The cumulative amount Qsum of flow may correspond to a gas parameter in the present disclosure.

The gas purification controller 51 may compare the calculated cumulative amount Qsum of flow with a threshold value Qsumt. If the cumulative amount Qsum of flow is less than the threshold value Qsumt (S400: NO), the gas purification controller 51 may return to S330. The control of the valves EX-V2 and C-V1 at S330 may be kept unchanged. If the cumulative amount Qsum of flow is equal to or larger than the threshold value Qsumt (S400: YES), the gas purification controller 51 may proceed to S410.

At S410, the gas purification controller 51 may exhaust the laser gas in the laser gas purifying system. While exhausting the laser gas in the laser gas purifying system, the gas purification may be temporarily suspended. Details of S410 are described below with reference to FIG. 6.

After S410, the gas purification controller 51 may determine at S430 whether the gas purification is to be ended. If the gas purification is not to be ended (S430: NO), the gas purification controller 51 may return to S305 to reset the cumulative amount of flow to the initial value. Every time the cumulative amount Qsum of flow reaches the threshold value Qsumt, the gas purification controller 51 may exhaust the laser gas in the laser gas purifying system. In contrast, if the gas purification is to be ended (S430: YES), the gas purification controller 51 may end the gas purification in the process of this flowchart.

Figure 6:
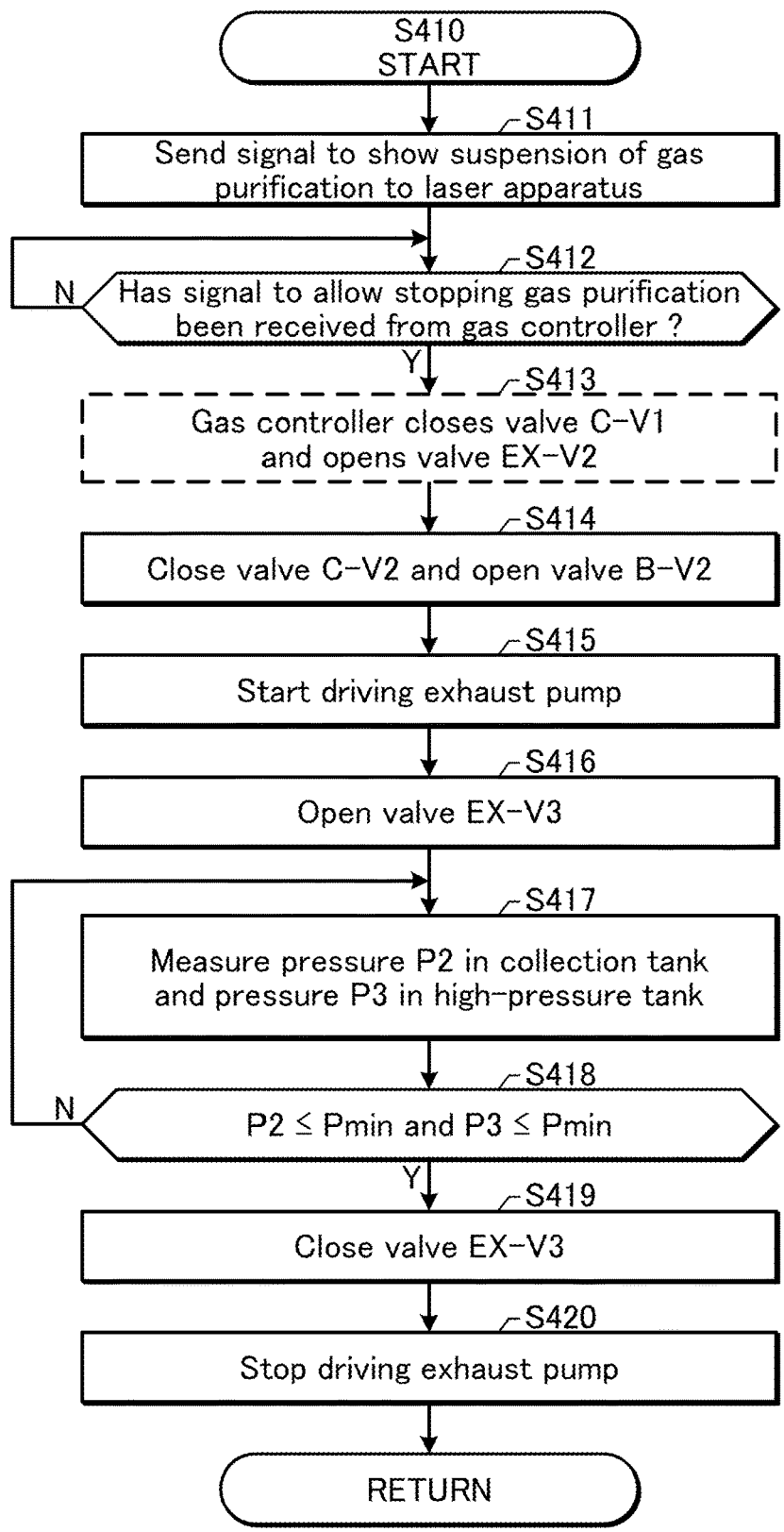
FIG. 6 is a flowchart showing details of a process of S410 shown in FIG. 5.

FIG. 6 is a flowchart showing the details of the process of S410 shown in FIG. 5. The gas purification controller 51 may exhaust the laser gas in the laser gas purifying system as described below.

First, at S411, the gas purification controller 51 may send a signal to show suspension of gas purification to the laser apparatus 30. The signal to show suspension of gas purification may cancel the signal to show completion of preparation for gas purification described above with reference to FIG. 5.

Next, at S412, the gas purification controller 51 may determine whether it has received a signal to allow stopping gas purification from the gas controller 47. The gas purification controller 51 may wait until receiving the signal to allow stopping gas purification from the gas controller 47.

The gas controller 47 may close the valve C-V1 and open the valve EX-V2 (S413) in the process of S170 in FIG. 2. The emission gas emitted from the chamber 10 to the exhausting device 43 may thus be exhausted to the outside of the exhausting device 43 without flowing into the laser gas purifying system 50a.

Next, at S414, the gas purification controller 51 may close the valve C-V2 and open the valve B-V2. The new gas from the buffer gas supply source B may thus be supplied to the laser apparatus 30.

Next, at S415, the gas purification controller 51 may start driving the exhaust pump 76.

Next, at S416, the gas purification controller 51 may open the valve EX-V3. Exhausting the laser gas in the laser gas purifying system may thus be started.

Next, at S417, the gas purification controller 51 may measure the pressure P2 in the collection tank 53 and the pressure P3 in the high-pressure tank 59. The data on the pressures P2 and P3 may be received from the pressure sensors 54 and 60, respectively.

Next, at S418, the gas purification controller 51 may compare the measured pressures P2 and P3 each with a threshold value Pmin. The threshold value Pmin may be lower than the value of the atmospheric pressure. If both of the measured pressures P2 and P3 are equal to or lower than the threshold value Pmin (S418: YES), the gas purification controller 51 may proceed to S419. If at least one of the measured pressures P2 and P3 is higher than the threshold value Pmin (S418: NO), the gas purification controller 51 may return to S417 to continue exhausting the gas until the pressures P2 and P3 are equal to or lower than the threshold value Pmin.

At S419, the gas purification controller 51 may close the valve EX-V3.

Next, at S420, the gas purification controller 51 may stop driving the exhaust pump. Exhausting the laser gas in the laser gas purifying system may thus stop.

After S420, the gas purification controller 51 may end the process of this flowchart to return to the process shown in FIG. 5.

3.4 Supplementary Explanation

In the first embodiment, the gas purification flow path is exhausted by the exhaust pump 76 until the pressures P2 and P3 are equal to or lower than the threshold value Pmin. However, the present disclosure is not limited to this. Just opening the valve EX-V3 may allow the laser gas in the gas purification flow path to be exhausted via the check valve 78 to a pressure substantially equal to the atmospheric pressure. This is described below with reference to FIG. 8.

In the first embodiment, the gas controller 47 and the gas purification controller 51 may send the signals directly to each other. However, the present disclosure is not limited to this. The gas controller 47 may receive the signals from the gas purification controller 51 via the laser controller 31. The gas purification controller 51 may receive the signals from the gas controller 47 via the laser controller 31.

In the first embodiment, the fluorine trap 45 is provided in the pipe 21. However, the present disclosure is not limited to this. Instead of the fluorine trap 45 provided in the pipe 21, an unillustrated fluorine trap may be provided in each of the pipes 22 and 24. The fluorine trap in the pipe 22 may be provided upstream from a connecting portion connecting the bypass pipe 23 and the pipe 22 connected to the inlet of the exhaust pump 46. The fluorine trap in the pipe 24 may be provided upstream from the filter 52.

In the first embodiment, the treating agent filled in the fluorine trap 45 is the combination of zeolite and calcium oxide. However, the present disclosure is not limited to this. The treating agent filled in the fluorine trap 45 may be a combination of zeolite and calcium hydroxide.

The treating agent filled in the fluorine trap 45 may be alkaline earth metal such as calcium. If the treating agent filled in the fluorine trap 45 is alkaline earth metal, the fluorine trap 45 may be equipped with a heating device. If the treating agent filled in the fluorine trap 45 is alkaline earth metal, the oxygen trap 56 may be replaced by a container filled with zirconium-based (Zr-based) metal. The container filled with zirconium-based metal may be equipped with a heating device.

In the first embodiment, description is made in the case where the laser apparatus 30 is a KrF excimer laser apparatus. However, the present disclosure is not limited to this. The laser apparatus 30 may be, for example, an ArF excimer laser apparatus, a XeF excimer laser apparatus, or a XeCl excimer laser apparatus.

If the laser apparatus 30 is the XeF excimer laser apparatus, the fluorine-containing gas supply source F2 may supply laser gas where fluorine gas and neon gas are mixed. The buffer gas supply source B may supply laser gas where xenon gas and neon gas are mixed.

If the laser apparatus 30 is the XeCl excimer laser apparatus, the fluorine-containing gas supply source F2 may be substituted by a gas supply source supplying halogen-containing gas where chlorine gas, xenon gas, and neon gas are mixed. The buffer gas supply source B may supply laser gas where xenon gas and neon gas are mixed.

The ArF excimer laser apparatus is described below with reference to FIG. 18.

In the first embodiment, the exhausting device 43 including the exhaust pump 76 and the check valve 78 is provided in the pipe between the purifier 58 and the high-pressure tank 59. However, the present disclosure is not limited to this. The exhausting device may be provided at any position in the gas purification flow path between the valves C-V1 and C-V2.

3.5 Effect

Figure 7A:
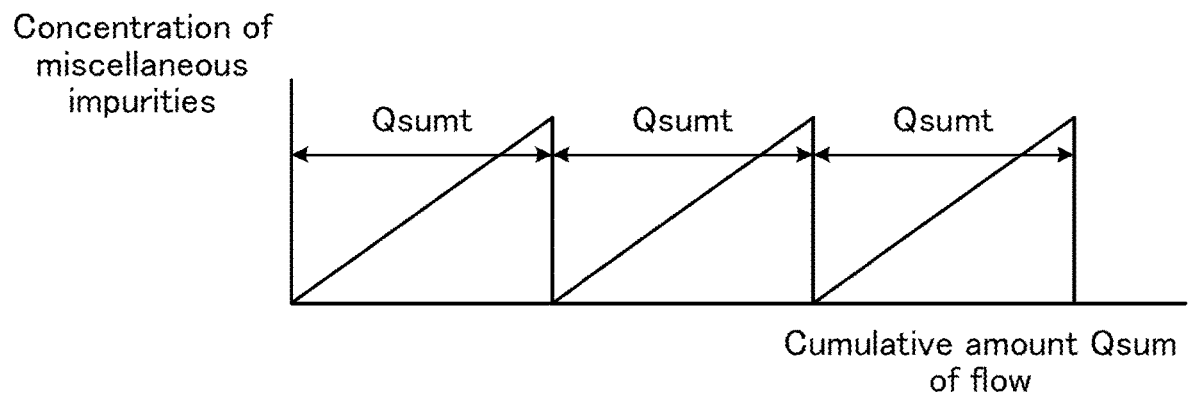
FIG. 7A is a graph conceptually showing changes in the concentration of miscellaneous impurities that are not removed by the laser gas purifying system 50a of the first embodiment.

FIG. 7A is a graph conceptually showing changes in the concentration of the miscellaneous impurities that are not removed by the laser gas purifying system 50a of the first embodiment. Repetition of purifying the laser gas may cause the miscellaneous impurities that are not removed by the laser gas purifying system 50a to be accumulated in the laser gas. According to the first embodiment, laser gas in the laser gas purifying system 50a may be exhausted every time the cumulative amount Qsum of flow reaches the predetermined threshold value Qsumt. This may suppress an increase in the concentration of the miscellaneous impurities that are not removed by the laser gas purifying system 50a beyond the threshold value.

In the first embodiment, the laser gas purifying system 50a may include the valve C-V2 provided in the flow path of the purified gas and the valve B-V2 provided in the flow path of the new gas supplied from the buffer gas supply source B. The valves C-V2 and B-V2 may be controlled by the gas purification controller 51. The laser apparatus 30 may include the valve B-V1 provided in the flow path of the purified gas or the new gas supplied from the laser gas purifying system 50a. The valve B-V1 may be controlled by the gas controller 47 included in the laser apparatus 30. As described above, whether the purified gas is supplied may depend on the state of the laser gas purifying system 50a. In the first embodiment, it may not be necessary for the laser apparatus 30 or the gas controller 47 to evaluate the state of the laser gas purifying system 50a. The gas purification controller 51 may determine whether the purified gas is supplied and control the valves C-V2 and B-V2. In the laser apparatus 30, the gas controller 47 may simply control the valve B-V1 to supply the new gas or the purified gas equivalent to the new gas to the chamber 10.

It is preferable that the valve C-V2 is a normally closed valve and the valve B-V2 is a normally open valve. The normally closed valve may be closed if the electric power source is turned OFF. The normally open valve may be open if the electric power source is turned OFF. If a part or all of the laser gas purifying system 50a stops and the valve control is invalid in this configuration, the new gas may be supplied via the normally open valve B-V2 to the chamber. This may suppress a trouble in the operation of the laser apparatus 30.

3.6 Modified Examples

Modified examples of the first embodiment are described below. The description on the modified examples mainly focuses on differences from the first embodiment described above. Descriptions may be omitted for some aspects substantially the same as those of the first embodiment described above.

3.6.1 Exhausting Gas Via Check Valve 78

Figure 8:
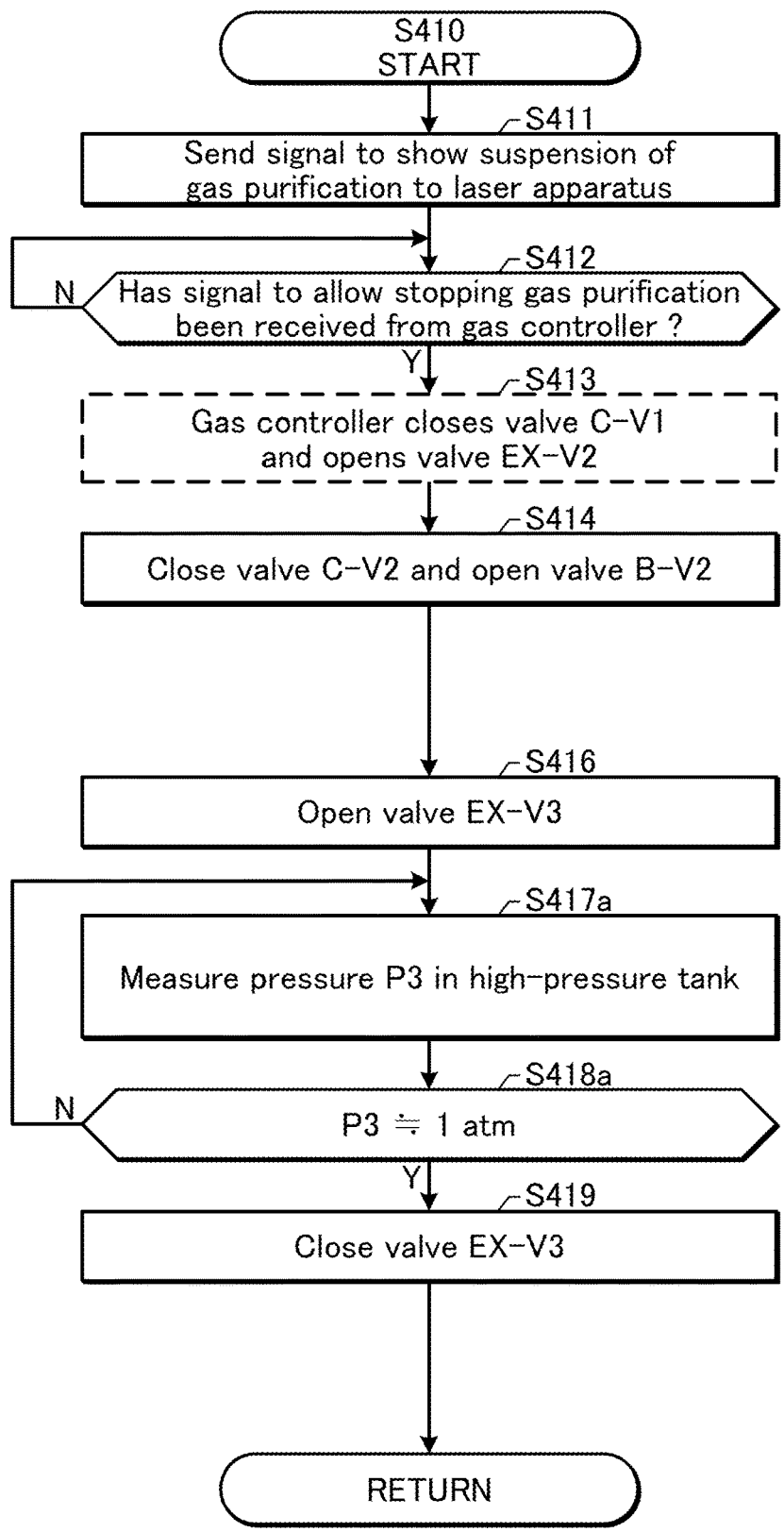
FIG. 8 is a flowchart showing a process of exhausting gas in the first modified example of the first embodiment.

FIG. 8 is a flowchart showing a process of exhausting gas in a first modified example of the first embodiment. The configuration of the laser apparatus 30 and that of the laser gas purifying system 50a in the first modified example may be substantially the same as described with reference to FIG. 4. The process of the gas purification in the first modified example may be substantially the same as that described with reference to FIG. 5.

In the first modified example, the gas purification controller 51 may exhaust the laser gas in the laser gas purifying system as follows.

The steps from S411 to S414, S416, and S419 may be substantially the same as described above with reference to FIG. 6. Driving (S415) and stopping (S420) of the exhaust pump 76 described with reference to FIG. 6 may be omitted in the first modified example. In the first modified example, opening and closing the valve EX-V3 (S416 and S419) may cause exhausting gas via the check valve 78.

After S416, the gas purification controller 51 may measure at S417a the pressure P3 in the high-pressure tank 59. Alternatively, the gas purification controller 51 may measure the pressure P2 in the collection tank 53. Namely, at least one of the pressure P2 and the pressure P3 may be measured.

Next, at S418a, the gas purification controller 51 may determine whether the pressure P3 in the high-pressure tank 59 or the pressure P2 in the collection tank 53 is substantially equal to the atmospheric pressure. If the pressure P3 or the pressure P2 is substantially equal to the atmospheric pressure (S418a: YES), the gas purification controller 51 may proceed to S419. If the pressure P3 or the pressure P2 is not substantially equal to the atmospheric pressure (S418a: NO), the gas purification controller 51 may return to S417a to continue the process of exhausting gas until the pressure P3 or the pressure P2 is substantially equal to the atmospheric pressure.

Figure 7B:
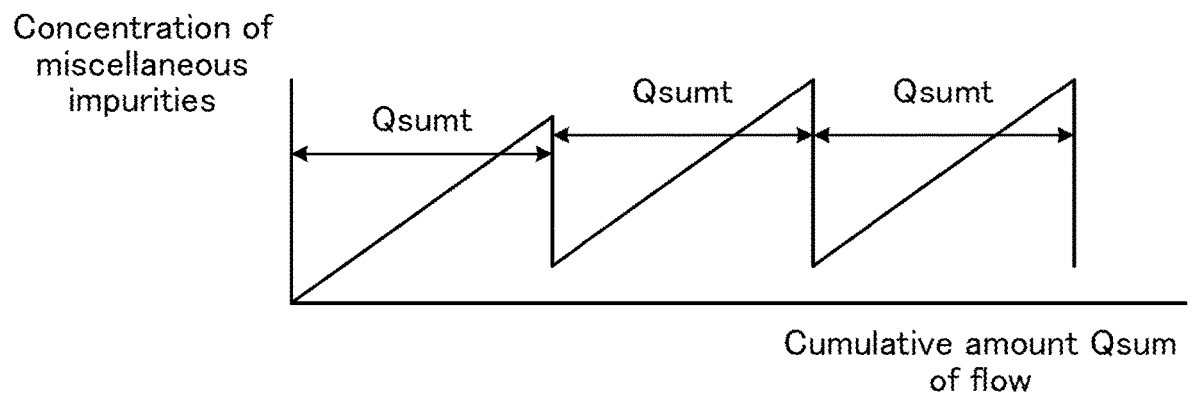
FIG. 7B is a graph conceptually showing changes in the concentration of the miscellaneous impurities that are not removed by the laser gas purifying system 50a of a first modified example of the first embodiment.

FIG. 7B is a graph conceptually showing changes in the concentration of the miscellaneous impurities that are not removed by the laser gas purifying system 50a of the first modified example of the first embodiment. In the first modified example, laser gas in the laser gas purifying system 50a may be exhausted to around the atmospheric pressure. Accordingly, the concentration of the impurities may not be reduced to around 0. However, when the cumulative amount Qsum of flow reaches the predetermined threshold value Qsumt, laser gas in the laser gas purifying system 50a may be exhausted to around the atmospheric pressure. This may suppress an increase in the concentration of the impurities beyond the threshold value.

3.6.2 Exhausting Gas Based on Operating Time of Purifying Apparatus

Figure 9:
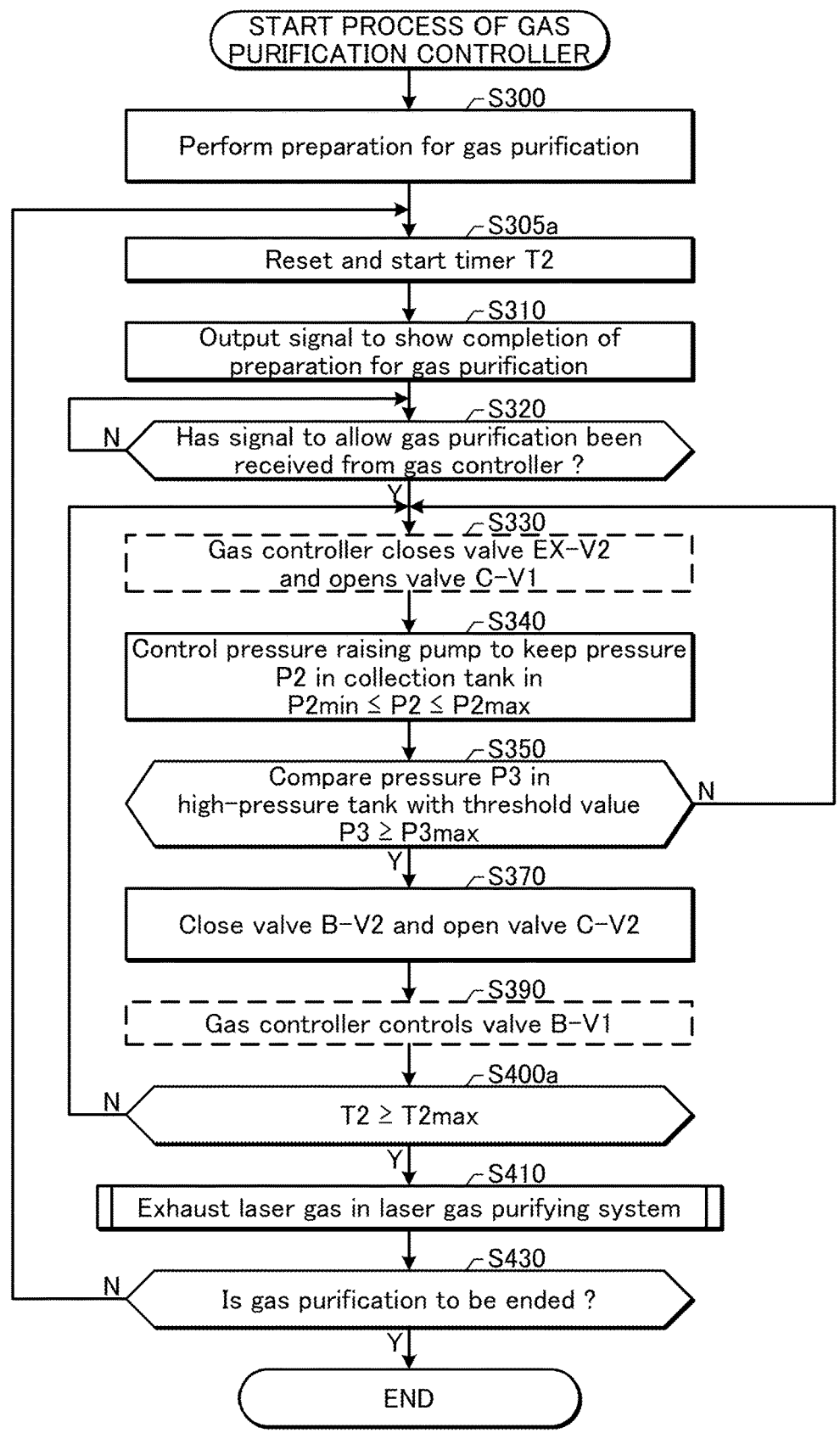
FIG. 9 is a flowchart showing a process of gas purification in a second modified example of the first embodiment.

FIG. 9 is a flowchart showing a process of gas purification in a second modified example of the first embodiment. The configuration of the laser apparatus 30 and that of the laser gas purifying system 50a in the second modified example may be substantially the same as described with reference to FIG. 4. However, the flow meter 75 may be omitted in the second modified example.

In the second modified example, the gas purification controller 51 may perform gas purification as follows.

The steps of S300, from S310 to S390, S410, and S430 may be substantially the same as described above with reference to FIG. 5. The step (S305) of the initial setting of the cumulative amount of flow and the step (S400) of calculating the cumulative amount of flow and comparing it with the threshold value both described with reference to FIG. 5 may be substituted in the second modified example by S305a and S400a, respectively, as follows.

At S305a, the gas purification controller 51 may reset and start a timer T2 showing operating time of the purifying apparatus. The operating time of the purifying apparatus may correspond to a gas parameter in the present disclosure.

After starting the gas purification, the gas purification controller 51 may determine at S400a whether the value of the timer T2 has reached the periodic time T2max for exhausting gas. If the value of the timer T2 has reached the periodic time T2max (S400a: YES), the gas purification controller 51 may proceed to S410. If the value of the timer T2 has not reached the periodic time T2max (S400a: NO), the gas purification controller 51 may return to S330 to repeat the process of counting the timer T2 and determining the periodic time T2max, with the process of gas purification.

After exhausting gas at S410, if the gas purification is not to be ended (S430: NO), the gas purification controller 51 may return to S305a to reset and start the timer T2. Every time the value of the timer T2 reaches the periodic time T2max, the gas purification controller 51 may exhaust laser gas in the laser gas purifying system 50a. The periodic time T2max may be, for example, 1 day or more, 10 days or less.

3.6.3 Exhausting Gas Based on Laser Parameters

Figure 10:
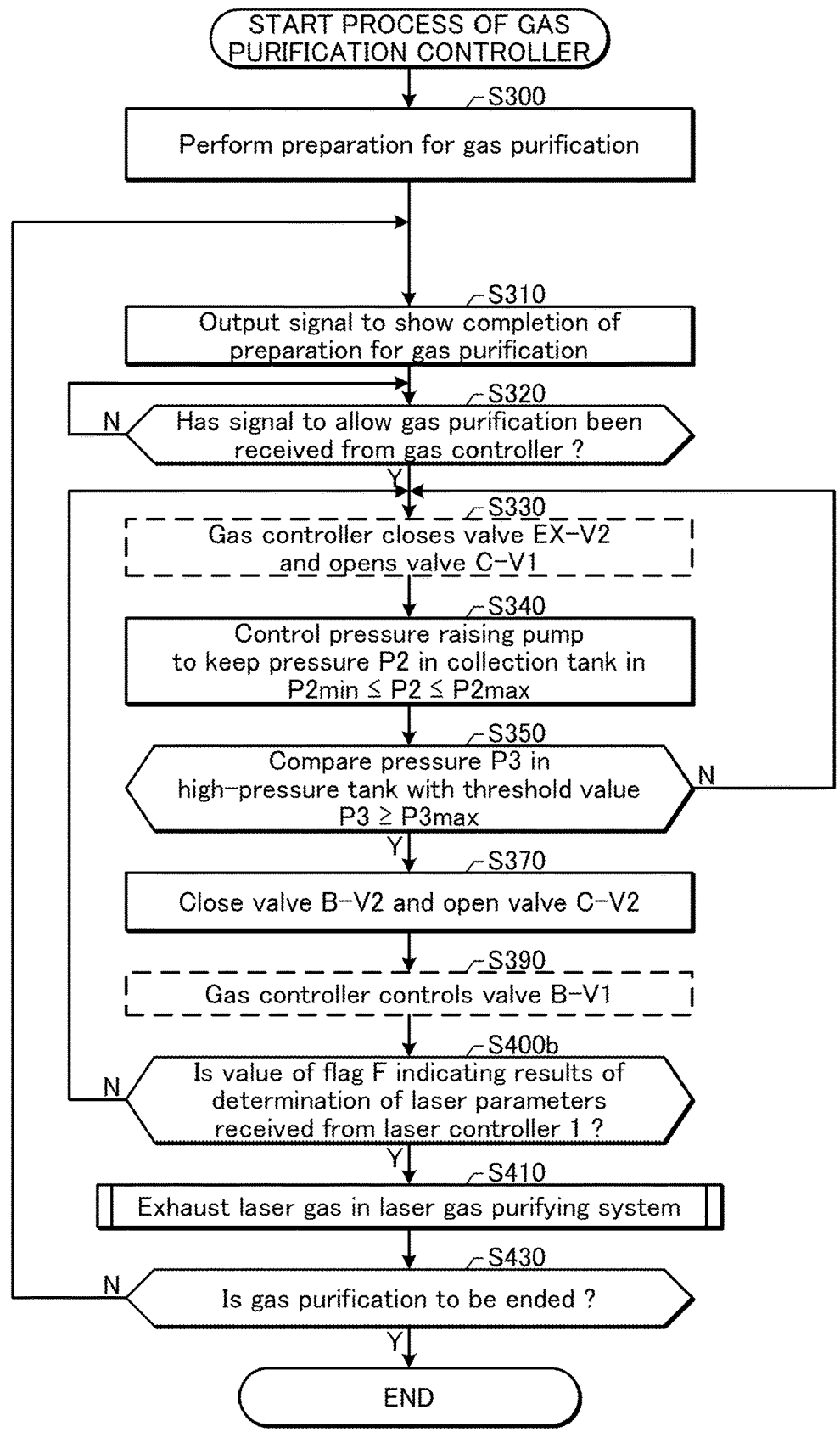
FIG. 10 is a flowchart showing a process of gas purification in a third modified example of the first embodiment.

FIG. 10 is a flowchart showing a process of gas purification in a third modified example of the first embodiment. The configuration of the laser apparatus 30 and that of the laser gas purifying system 50a in the third modified example may be substantially the same as described with reference to FIG. 4. However, the flow meter 75 may be omitted in the third modified example.

In the third modified example, the gas purification controller 51 may perform gas purification as follows.

The steps of S300, S310 to S390, S410, and S430 may be substantially the same as described above with reference to FIG. 5 or FIG. 9. In the third modified example, the step (S305) of the initial setting of the cumulative amount of flow described with reference to FIG. 5 may be omitted. The step (S305a) of resetting and starting the timer T2 described with reference to FIG. 9 may be omitted. The step (S400) of calculating the cumulative amount of flow and comparing it with the threshold value both described with reference to FIG. 5 or the step (S400a) of comparing the value of the timer T2 with the periodic time T2max described with reference to FIG. 9 may be substituted in the third modified example by S400b described below.

At S400b, the gas purification controller 51 may receive a flag F indicating results of determination of the laser parameters from the laser controller 31 and refer to the value of the flag F. The flag F is described below with reference to FIG. 11.

If the value of the flag F is 1 (S400b: YES), the gas purification controller 51 may proceed to S410. If the value of the flag F is not 1 (S400b: NO), the gas purification controller 51 may return to S330 to repeat the process of receiving the flag F, with the process of gas purification.

After exhausting gas at S410, if the gas purification is not to be ended (S430: NO), the gas purification controller 51 may return to S310. Every time the value of the flag F is set to 1, the gas purification controller 51 may exhaust laser gas in the laser gas purifying system 50a.

Figure 11:
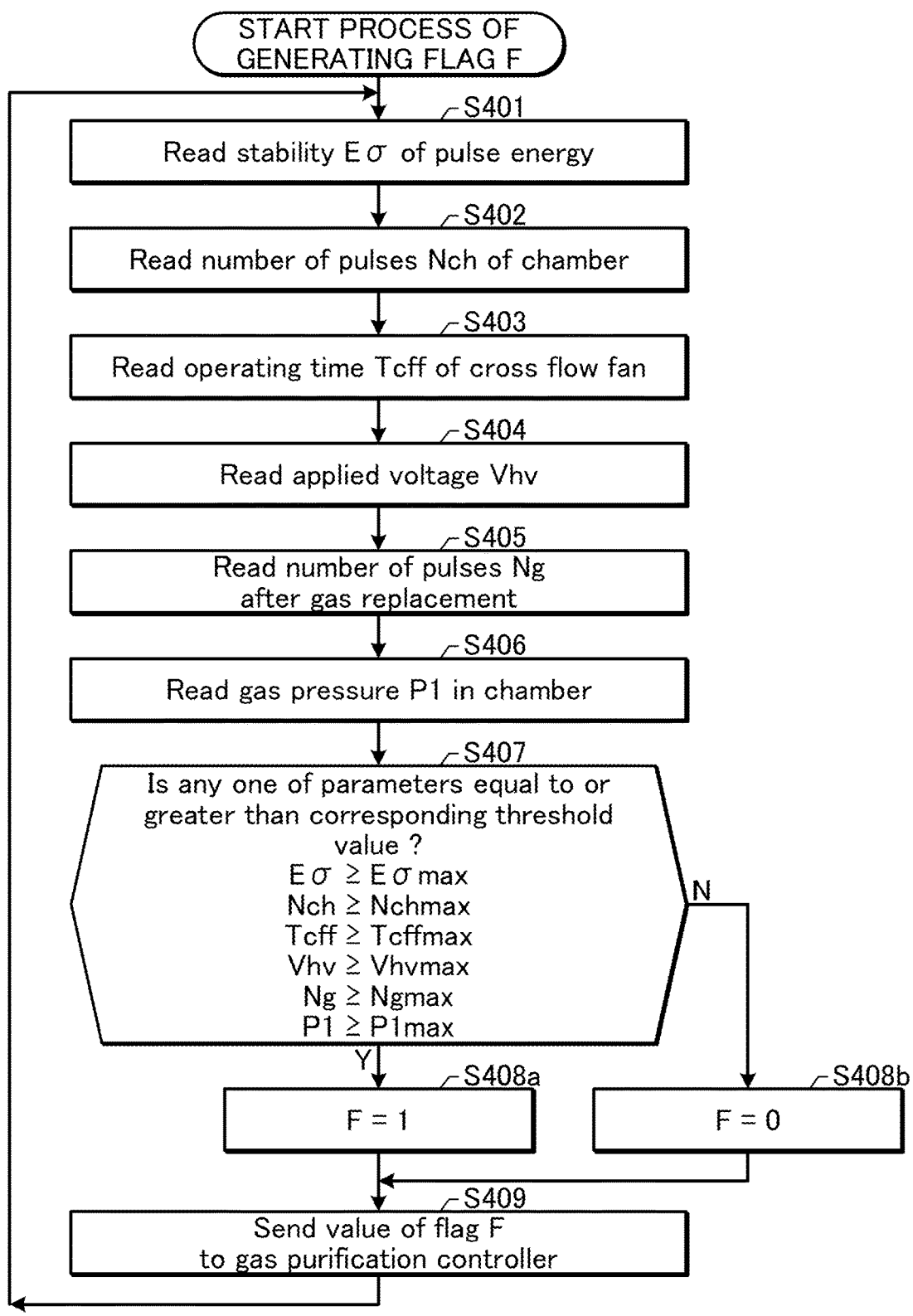
FIG. 11 is a flowchart showing a process of generating a flag F in the third modified example of the first embodiment.

FIG. 11 is a flowchart showing a process of generating the flag F in the third modified example of the first embodiment. In the third modified example, the laser controller 31 may generate the flag as follows.

First, at S401, the laser controller 31 may read a value of stability $E\sigma$ of the pulse energy. The stability $E\sigma$ of the pulse energy may be calculated by the laser controller 31 based on the data on the pulse energy measured by the power monitor 17.

Next, at S402, the laser controller 31 may read a value of the number of pulses Nch of the chamber. The number of pulses Nch of the chamber may be the number of pulses outputted since the chamber 10 was installed. The value of the number of pulses Nch of the chamber may be obtained by the laser controller 31 by counting detection signals of the pulse energy outputted from the power monitor 17 or counting the oscillation trigger signal.

Next, at S403, the laser controller 31 may read a value of operating time Tcff of an unillustrated cross flow fan. The operating time Tcff of the cross flow fan may be a period of time of operating the cross flow fan circulating the laser gas in the chamber 10.

Next, at S404, the laser controller 31 may read a value of applied voltage Vhv. The applied voltage Vhv may be a setting value of the voltage to be applied by the charger 12 to the pair of discharge electrodes 11a and 11b.

Next, at S405, the laser controller 31 may read a value of the number of pulses Ng after gas replacement. The number of pulses Ng after gas replacement may be obtained by counting the number of pulses after a total gas replacement of the laser gas in the chamber 10.

Next, at S406, the laser controller 31 may read a value of the gas pressure P1 in the chamber. The gas pressure P1 in the chamber may be obtained from the measured data outputted from the chamber pressure sensor 16.

The steps from S401 to S406 may not necessarily be performed in this order. Further, one or more of these steps may be omitted.

Next, at S407, the laser controller 31 may determine whether the parameters described above are equal to or greater than respective threshold values. Namely, whether the value of the stability $E\sigma$ of the pulse energy is equal to or higher than a threshold value $E\sigma$max may be determined. Whether the value of the number of pulses Nch of the chamber is equal to or larger than a threshold value Nchmax may be determined. Whether the value of the operating time Tcff of the cross flow fan is equal to or longer than a threshold value Tcffmax may be determined. Whether the value of the applied voltage Vhv is equal to or higher than a threshold value Vhvmax may be determined. Whether the value of the number of pulses Ng after gas replacement is equal to or larger than a threshold value Ngmax may be determined. Whether the value of the gas pressure P1 in the chamber is equal to or higher than a threshold value P1max may be determined.

If any one of the parameters described above is equal to or greater than the corresponding threshold value (S407: YES), the laser controller 31 may set at S408a the flag F to 1.

If none of the parameters described above is equal to or greater than the corresponding threshold value (S407: NO), the laser controller 31 may set at S408b the flag F to 0.

After S408a or S408b, the laser controller 31 may send at S409 the value of the flag F to the gas purification controller 51.

After S409, the laser controller 31 may return to S401 to repeat the process described above. If the number of pulses Nch of the chamber reaches the threshold value Nchmax and then the laser controller 31 returns to S401 to repeat the process described above, the number of pulses Nch of the chamber may be reset and counted from 1. The same manner may be applied to the operating time Tcff of the cross flow fan and the number of pulses Ng after gas replacement.

According to the process described above, every time one of the laser parameters reaches the corresponding predetermined value, the value of the flag F may be reset to 1 and the process of exhausting gas may be performed at S410 in FIG. 10. This may suppress an increase in the concentration of the impurities in the laser gas purifying system 50a beyond the threshold value.

4. Laser Gas Purifying System that Supplies New Gas 4.1 Configuration

Figure 12:
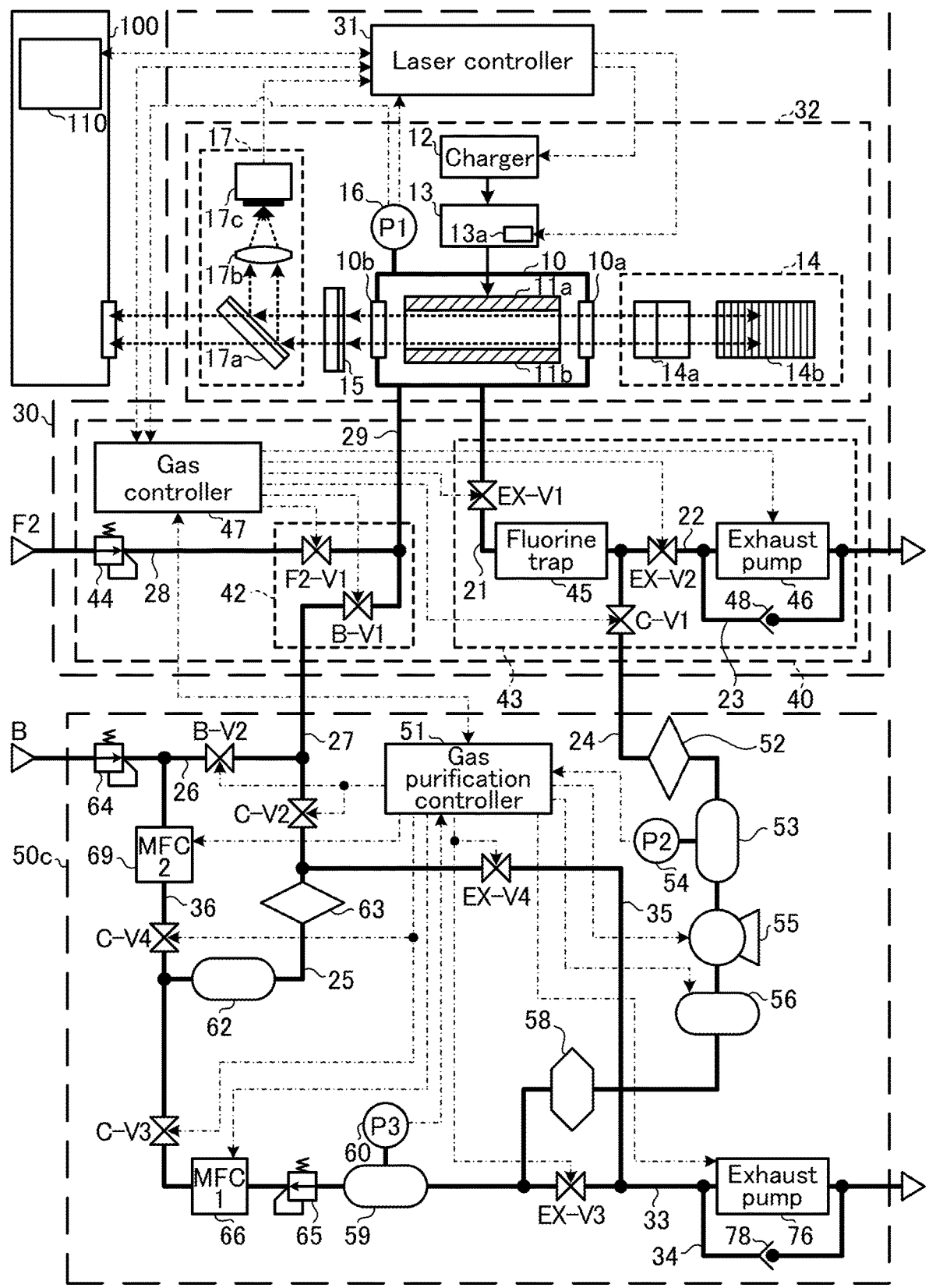
FIG. 12 schematically shows a configuration of a laser apparatus 30 and that of a laser gas purifying system 50c according to a second embodiment of the present disclosure.

FIG. 12 schematically shows a configuration of a laser apparatus 30 and that of a laser gas purifying system 50c according to a second embodiment of the present disclosure. The laser gas purifying system 50c in the second embodiment may include a first mass-flow controller 66, a valve C-V3, and a supply tank 62. The laser gas purifying system 50c may further include pipes 35 and 36, a valve EX-V4, a second mass-flow controller 69, and a valve C-V4. The configuration of the laser apparatus 30 in the second embodiment may be substantially the same as that in the first embodiment.

The first mass-flow controller 66, the valve C-V3, and the supply tank 62 may be arranged in this order from a position near the regulator 65 in the pipe 25 between the regulator 65 and the filter 63.

One end of the pipe 35 may be connected to the pipe 25 between the filter 63 and the valve C-V2. The other end of the pipe 35 may be connected to the pipe 33 between the valve EX-V3 and the exhaust pump 76. The valve EX-V4 may be provided in the pipe 35. Such pipe 35 and valve EX-V4 may similarly be provided in the first embodiment described above.

One end of the pipe 36 may be connected to the pipe 26 between the regulator 64 and the valve B-V2. The other end of the pipe 36 may be connected to the pipe 25 between the valve C-V3 and the supply tank 62. The second mass-flow controller 69 and the valve C-V4 in the pipe 36 may be arranged in this order from a position near the regulator 64.

4.2 Operation

The valve EX-V4 may be controlled by the gas purification controller 51. When the valve EX-V4 is open, the pipe 35 may allow laser gas in the pipe 25 to flow to the pipe 33. Laser gas at least downstream from the valve C-V3 in the gas purification flow path may thus be exhausted via the exhaust pump 76 or the check valve 78. When the valve EX-V3 is open, laser gas upstream from the valve C-V3 in the gas purification flow path may be exhausted via the exhaust pump 76 or the check valve 78.

The first mass-flow controller 66 and the valve C-V3 may be controlled by the gas purification controller 51. The first mass-flow controller 66 may adjust the flow rate of the purified gas supplied from the regulator 65 to a predetermined value. When the valve C-V3 is open, the purified gas at the flow rate adjusted by the first mass-flow controller 66 may be supplied to the supply tank 62.

The second mass-flow controller 69 and the valve C-V4 may be controlled by the gas purification controller 51. The second mass-flow controller 69 may adjust the flow rate of the new gas supplied from the regulator 64 to a predetermined value. When the valve C-V4 is open, the new gas at the flow rate adjusted by the second mass-flow controller 69 may be supplied to the supply tank 62.

The purified gas and the new gas may thus be supplied to the supply tank 62. The mixing ratio of the purified gas and the new gas may be defined by the flow rates of the first and second mass-flow controllers 66 and 69. The supply tank 62 may supply mixed gas, in which the purified gas and the new gas are mixed, via the valve C-V2 to the gas supply device 42.

4.3 Process of Gas Purification Controller

Figure 13:
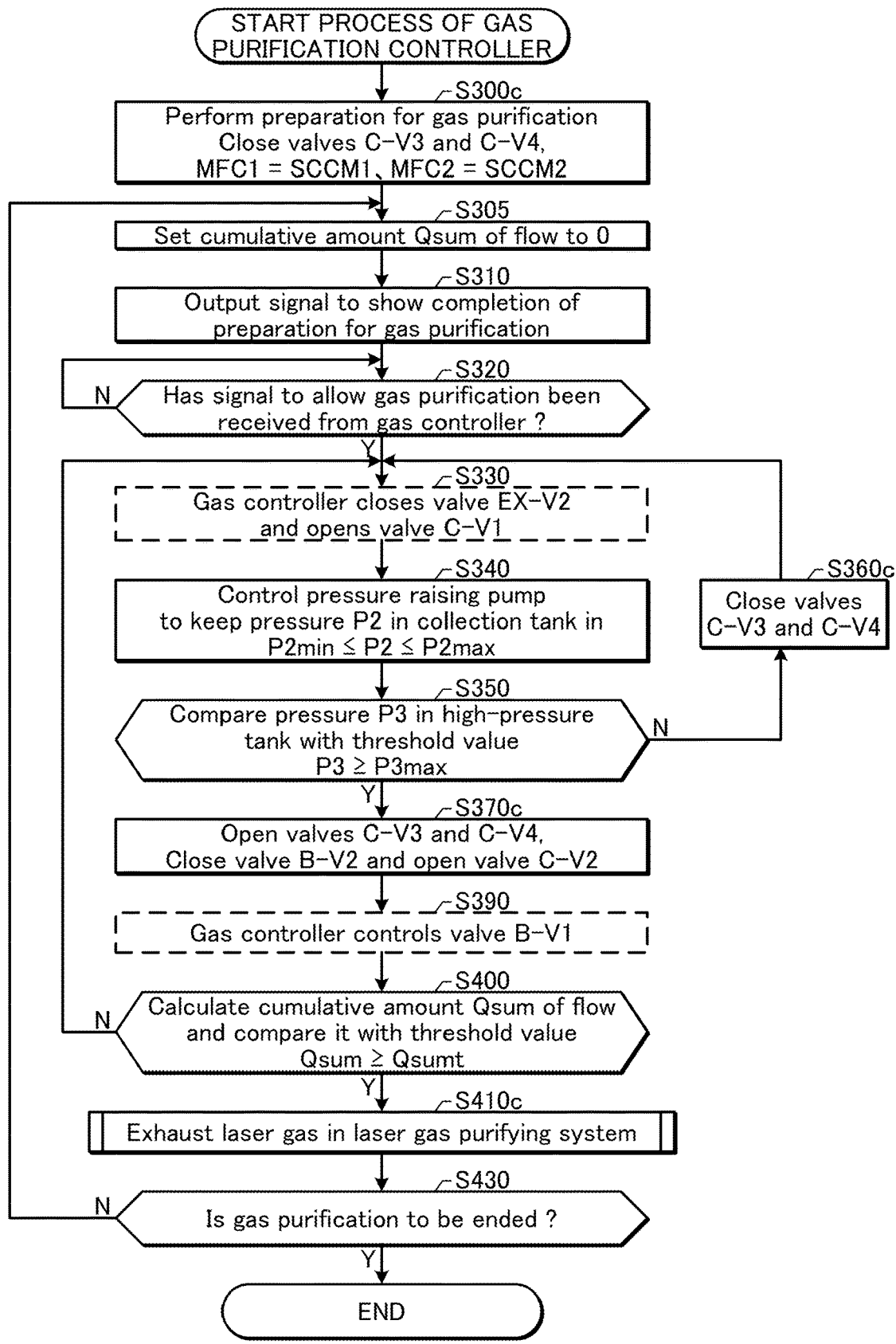
FIG. 13 is a flowchart showing a process of a gas purification controller 51 in the laser gas purifying system 50c according to the second embodiment.

FIG. 13 is a flowchart showing a process of the gas purification controller 51 in the laser gas purifying system 50c according to the second embodiment. The laser gas purifying system 50c may perform gas purification in the process described below performed by the gas purification controller 51.

First, at S300c, the gas purification controller 51 may perform preparation for gas purification. In the preparation for gas purification, both of the valves C-V3 and C-V4 may be closed. The gas purification controller 51 may set the flow rate MFC1 of the first mass-flow controller 66 to a constant value SCCM1. The gas purification controller 51 may set the flow rate MFC2 of the second mass-flow controller 69 to a constant value SCCM2.

The next process from S305 to S350 may be substantially the same as that described with reference to FIG. 5. At S350, if the pressure P3 in the high-pressure tank 59 is equal to or higher than a threshold value P3max (S350: YES), the gas purification controller 51 may proceed to S370c.

At S370c, the gas purification controller 51 may open both of the valves C-V3 and C-V4. The purified gas may thus be supplied via the first mass-flow controller 66 and the valve C-V3 to the supply tank 62. The new gas may also be supplied via the second mass-flow controller 69 and the valve C-V4 to the supply tank 62. According to the flow rate MFC1 and the flow rate MFC2 described above, the mixing ratio of the purified gas and the new gas may be adjusted to a desired value. As described above with reference to FIG. 5, the valve B-V2 may be closed and the valve C-V2 may be opened.

At S350, if the pressure P3 in the high-pressure tank 59 is lower than the threshold value P3max (S350: NO), the gas purification controller 51 may proceed to S360c. At S360c, the gas purification controller 51 may close both the valve C-V3 and the valve C-V4. After S360c, the gas purification controller 51 may return to S330 to continue driving of the pressure raising pump 55 at S340.

The steps of S390, S400, and S430 may be substantially the same as described with reference to FIG. 5. The step of S410 in the first embodiment may be substituted by S410c in the second embodiment to exhaust laser gas in the laser gas purifying system. Details of S410c are described below with reference to FIG. 14.

Figure 14:
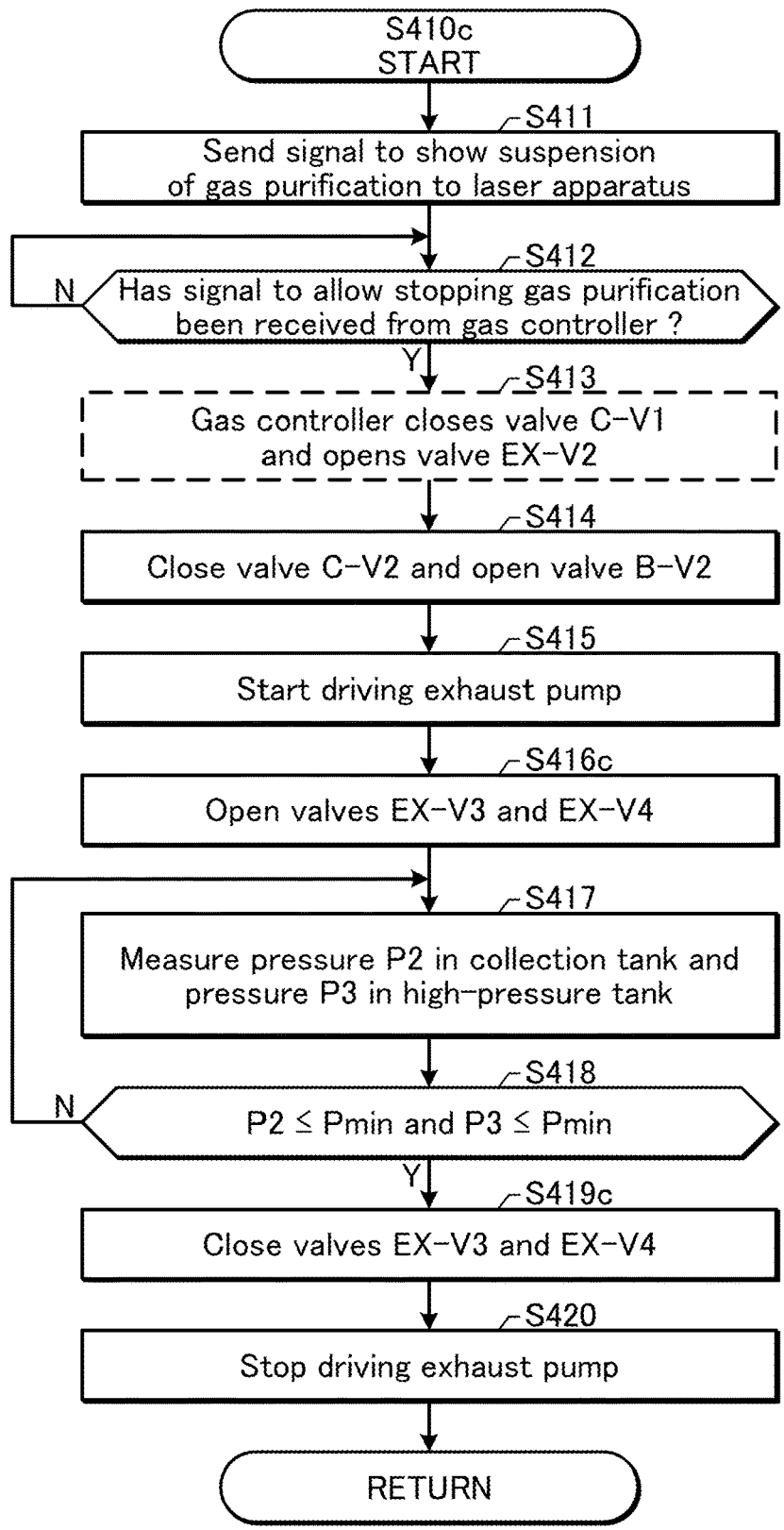
FIG. 14 is a flowchart showing details of a process of S410c shown in FIG. 13.

FIG. 14 is a flowchart showing the details of the process of S410c shown in FIG. 13. The gas purification controller 51 may exhaust gas in the laser gas purifying system as follows.

The steps of S411 to S415, S417, S418, and S420 may be substantially the same as described with reference to FIG. 6. The steps of S416 and S419 in the first embodiment may be substituted in the second embodiment by S416c and S419c, respectively.

At S416c, the gas purification controller 51 may open not only the valve EX-V3 but also the valve EX-V4. This may allow exhausting gas not only via the valve EX-V3 but also via the valve EX-V4.

At S419c, the gas purification controller 51 may close not only the valve EX-V3 but also the valve EX-V4.

In the other aspects, the second embodiment may be substantially the same as the first embodiment. The modified examples described for the first embodiment may be applied to the second embodiment.

4.4 Effect

According to the second embodiment, the mixed gas in which the purified gas and the new gas are mixed may be supplied to the gas supply device 42. This may moderate the increase in the concentration of the miscellaneous impurities that are not removed by the laser gas purifying system 50c. Further, laser gas in the laser gas purifying system 50c may be exhausted via the valves EX-V3 and EX-V4. This may suppress an increase the concentration of the miscellaneous impurities that are not removed by the laser gas purifying system 50c beyond the threshold value.

4.5 Example to Suppress Increase in Pressure in High-Pressure Tank 59

A modified example of the second embodiment is described below. The description on the modified example mainly focuses on differences from the second embodiment described above. Descriptions may be omitted for some aspects substantially the same as those of the second embodiment.

Figure 15:
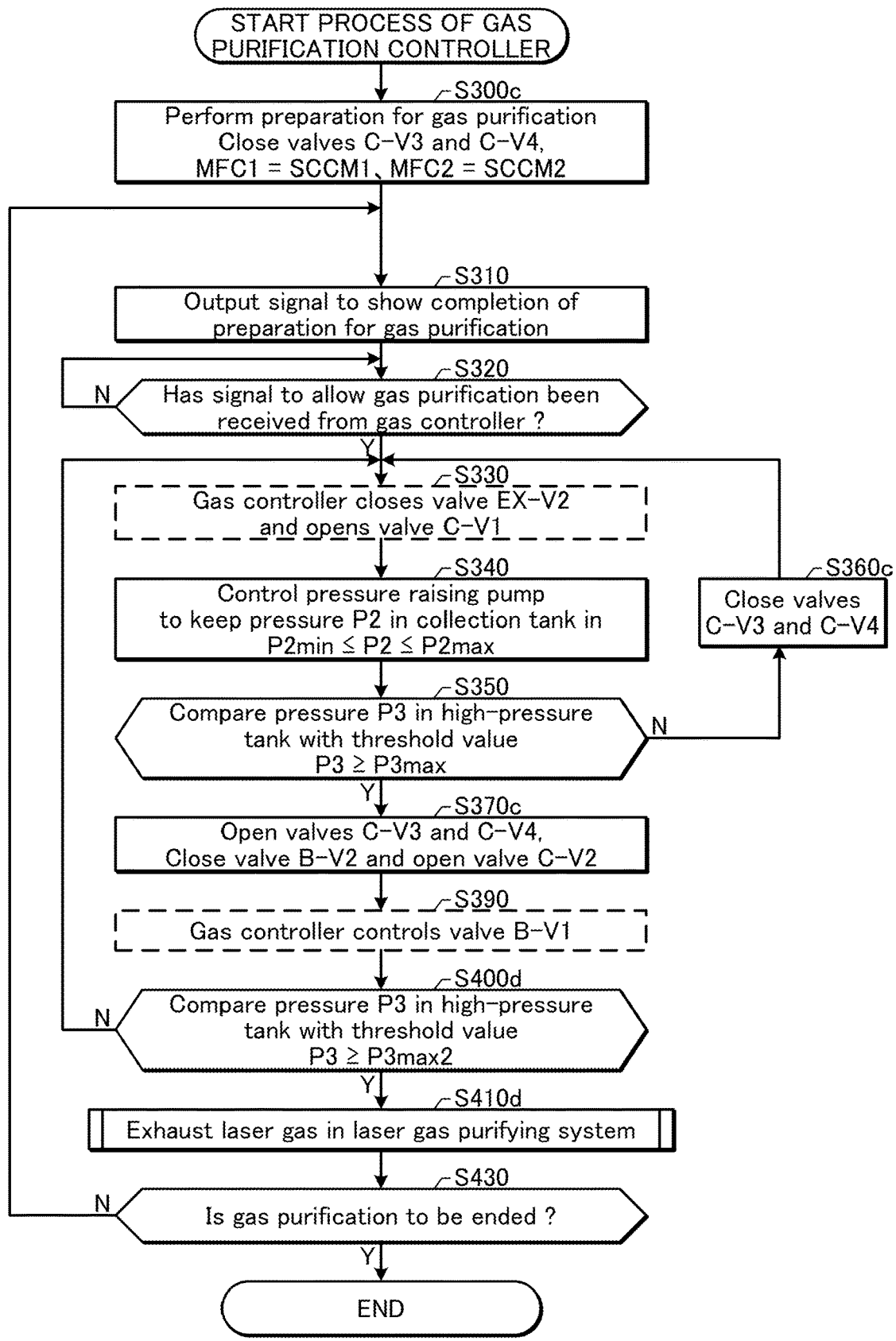
FIG. 15 is a flowchart showing a process of gas purification of a modified example of the second embodiment.

FIG. 15 is a flowchart showing a process of gas purification in the modified example of the second embodiment. The configuration of the laser apparatus 30 and that of the laser gas purifying system 50c in the modified example of the second embodiment may be substantially the same as described with reference to FIG. 12.

In the modified example of the second embodiment, the gas purification controller 51 may perform gas purification as follows.

The steps of S300c, S310 to S390, and S430 may be substantially the same as described with reference to FIG. 13. In the modified example, the step (S305) of the initial setting of the cumulative amount of flow described above with reference to FIG. 13 may be omitted. The step (S400) of calculating the cumulative amount of flow and comparing it with the threshold value described with reference to FIG. 13 may be substituted by S400d described below.

At S400d, the gas purification controller 51 may compare the pressure P3 in the high-pressure tank 59 with a second threshold value P3max2. The second threshold value P3max2 may be higher than the threshold value P3max for determining at S350 whether the purified gas can be supplied to the supply tank 62.

If the pressure P3 in the high-pressure tank 59 is lower than the second threshold value P3max2 (S400d: NO), the gas purification controller 51 may return to S330 to repeat driving the pressure raising pump 55 and supplying the new gas. If the pressure P3 in the high-pressure tank 59 is equal to or higher than the second threshold value P3max2 (S400d: YES), the gas purification controller 51 may proceed to S410d to exhaust laser gas in the laser gas purifying system 50c. Details of S410d are described below with reference to FIG. 16. After S410d, the gas purification controller 51 may proceed to S430.

Figure 16:
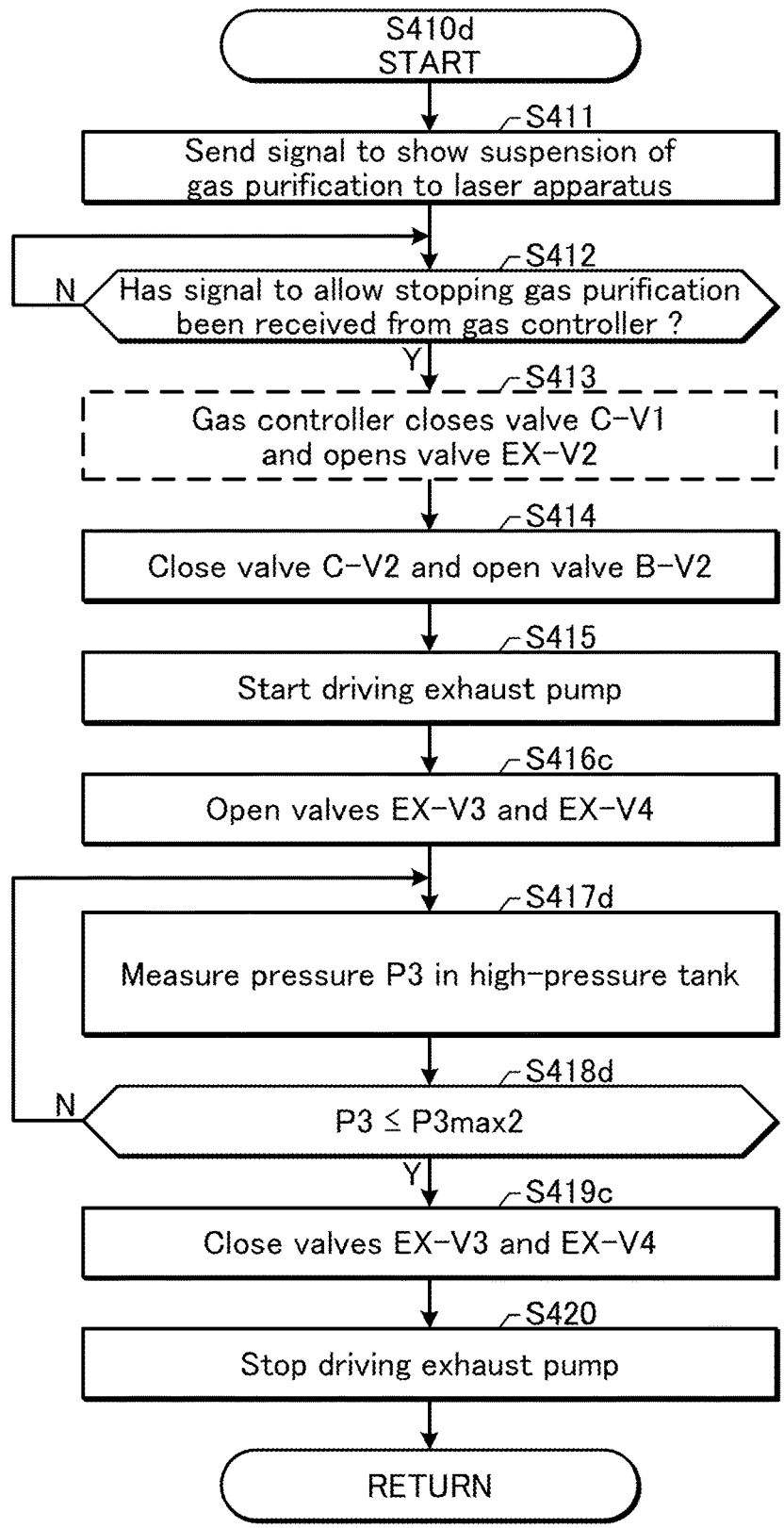
FIG. 16 is a flowchart showing details of a process of S410d shown in FIG. 15.

FIG. 16 is a flowchart showing the details of the process of S410d shown in FIG. 15. The gas purification controller 51 may exhaust laser gas in the laser gas purifying system as follows.

The steps from S411 to S416c, S419c, and S420 may be substantially the same as described with reference to FIG. 14. The steps of S417 and S418 may be substituted in the modified example of the second embodiment by S417d and S418d, respectively.

At S417d, the gas purification controller 51 may measure the pressure P3 in the high-pressure tank 59. The pressure P2 in the collection tank 53 may not necessarily be measured.

At S418d, the gas purification controller 51 may determine whether the pressure P3 in the high-pressure tank 59 is equal to or lower than the second threshold value P3max2. If the pressure P3 in the high-pressure tank 59 is higher than the second threshold value P3max2 (S418d: NO), the gas purification controller 51 may return to S417d to wait for reduction of the pressure P3 in the high-pressure tank 59. If the pressure P3 in the high-pressure tank 59 is equal to or lower than the second threshold value P3max2 (S418d: YES), the gas purification controller 51 may proceed to S419c. Alternatively, the gas purification controller 51 may wait until the pressure P3 in the high-pressure tank 59 is reduced to a value substantially equal to the threshold value P3max, and then proceed to S419c.

According to the process described above, laser gas in the laser gas purifying system 50c may be exhausted to the extent that the pressure P3 in the high-pressure tank 59 is not too high. The exhaust pump 76 may not necessarily be driven. Namely, the steps of S415 and S420 may be omitted. Further, rapid change in the concentration of the impurities may be suppressed.

Figure 17:
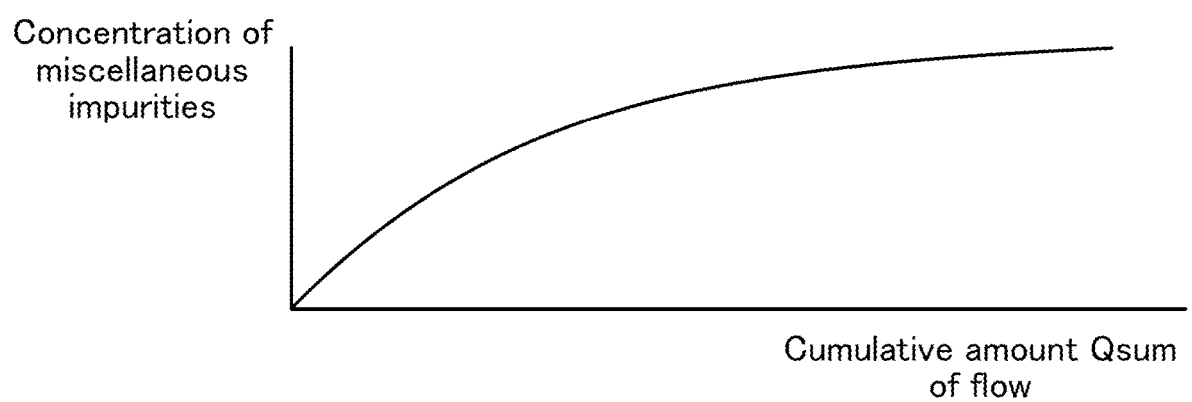
FIG. 17 is a graph conceptually showing changes in the concentration of the miscellaneous impurities that are not removed by the laser gas purifying system 50c of the second embodiment.

FIG. 17 is a graph conceptually showing changes in the concentration of the miscellaneous impurities that are not removed by the laser gas purifying system 50c of the second embodiment. Repeating the laser gas purification may cause impurities that are not removed by the laser gas purifying system 50c to be accumulated in the laser gas. According to the second embodiment, the mixed gas in which the purified gas and the new gas are mixed may be supplied to the gas supply device 42. This may moderate the increase in the concentration of the miscellaneous impurities that are not removed by the laser gas purifying system 50c. Further, according to the modified example described with reference to FIGS. 15 and 16, gas in the laser gas purifying system 50c is exhausted to the extent that the pressure P3 in the high-pressure tank 59 is not too high. The concentration of the miscellaneous impurities that are not removed by the laser gas purifying system 50c may increase to some extent, and then be substantially constant.

5. ArF Excimer Laser Apparatus and Laser Gas Purifying System 5.1 Configuration

Figure 18:
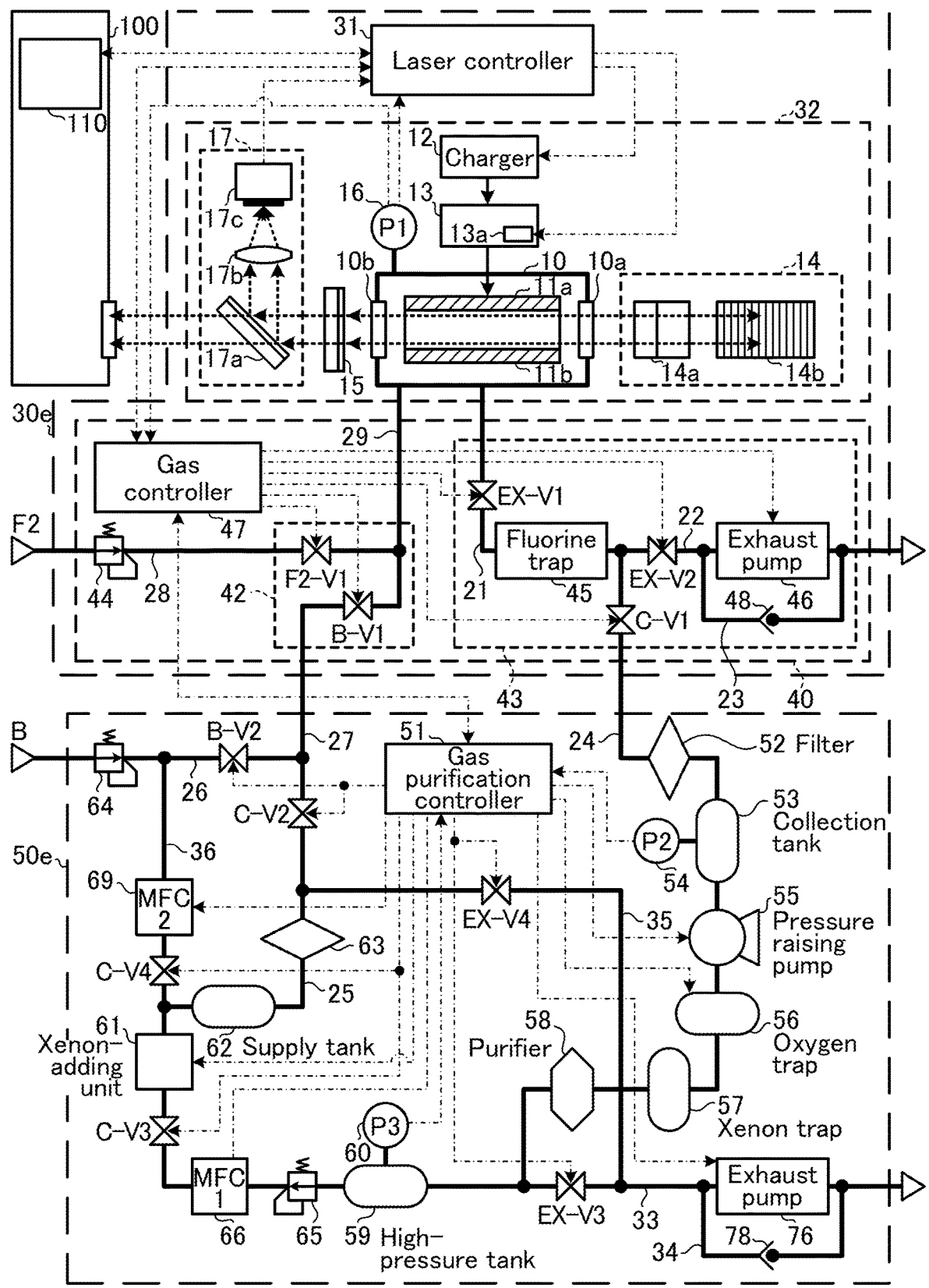
FIG. 18 schematically shows a configuration of a laser apparatus 30e and that of a laser gas purifying system 50e according to a third embodiment of the present disclosure.

FIG. 18 schematically shows a configuration of a laser apparatus 30e and that of a laser gas purifying system 50e according to a third embodiment of the present disclosure. In the third embodiment, the laser apparatus 30e may be constituted by an ArF excimer laser apparatus.

The configuration of the laser apparatus 30e in the third embodiment may be substantially the same as that of the laser apparatus 30 in the second embodiment. However, in the ArF excimer laser apparatus, the fluorine-containing gas supply source F2 may supply laser gas in which fluorine gas, argon gas, and neon gas are mixed. The buffer gas supply source B may supply laser gas in which argon gas, neon gas, and a small amount of xenon gas are mixed.

In the third embodiment, the laser gas purifying system 50e may include a xenon trap 57 and a xenon-adding unit 61. In other aspects, the configuration of the laser gas purifying system 50e may be substantially the same as that of the laser gas purifying system 50c in the second embodiment. Alternatively, the laser gas purifying system 50e may be configured by the laser gas purifying system 50a of the first embodiment in which the xenon trap 57, the xenon-adding unit 61, the first mass-flow controller 66, and the valve C-V3 are added.

The xenon trap 57 may be provided between the oxygen trap 56 and the purifier 58 in the pipe 24. The xenon trap 57 may cause xenon, which is gas in normal temperature and normal pressure, to be condensed or frozen by cooling it with liquid nitrogen. Alternatively, the xenon trap 57 may include zeolite to selectively adsorb xenon.

The xenon-adding unit 61 may be provided in the pipe 25 downstream from the valve C-V3 and upstream from a position where the pipe 25 is connected to the pipe 36. The xenon-adding unit 61 may be controlled by the gas purification controller 51.

Figure 19:
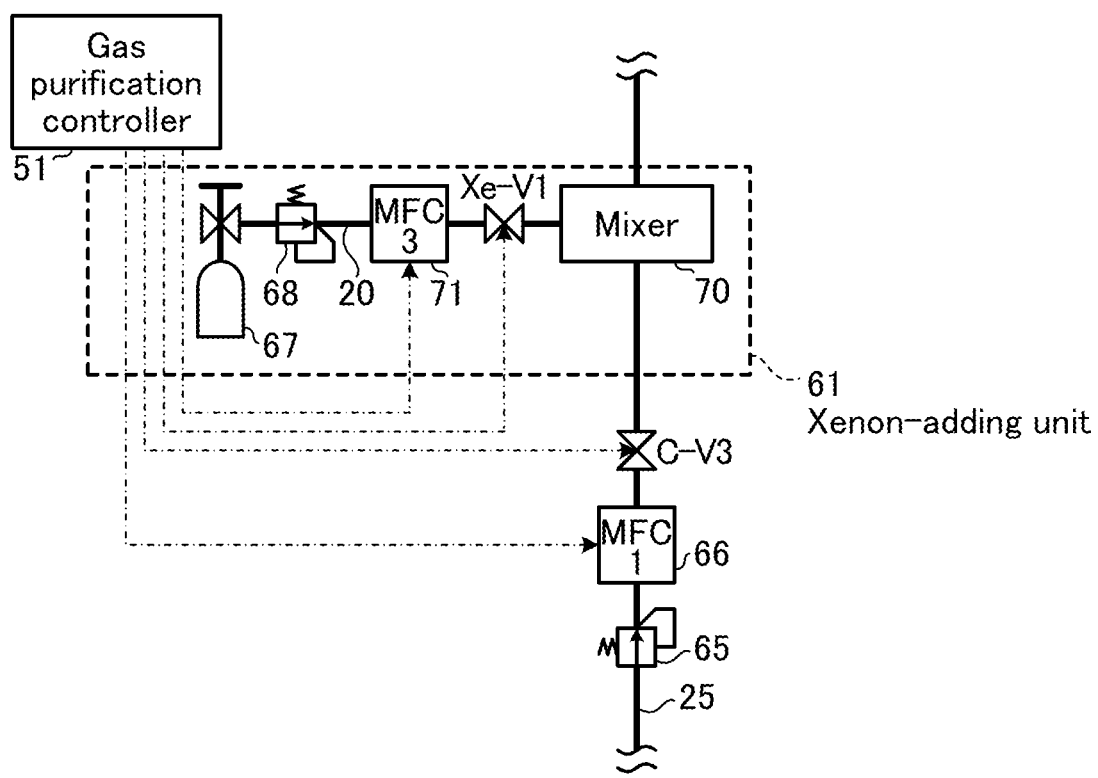
FIG. 19 schematically shows an exemplary configuration of a xenon-adding unit 61.

FIG. 19 schematically shows an exemplary configuration of the xenon-adding unit 61. The xenon-adding unit 61 may include a xenon-containing gas cylinder 67, a regulator 68, a third mass-flow controller 71, a valve Xe-V1, a mixer 70, and a pipe 20. The xenon-containing gas cylinder 67 may be provided at one end of the pipe 20. The regulator 68, the third mass-flow controller 71, the valve Xe-V1, and the mixer 70 may be provided in this order in the pipe 20 from a position near the xenon-containing gas cylinder 67. The mixer 70 may be provided at a connecting portion of the pipe 20 and the pipe 25.

The xenon-containing gas cylinder 67 may store xenon-containing gas having a xenon gas concentration that is higher than an optimum xenon gas concentration for an ArF excimer laser apparatus.

5.2 Operation

The xenon trap 57 may remove xenon gas from the purified gas passed through the oxygen trap 56. The purified gas passed through the xenon trap 57 and then passed through the first mass-flow controller 66 and the valve C-V3 may flow to the mixer 70.

The xenon-containing gas supplied from the xenon-containing gas cylinder 67 through the pipe 20 may flow via the regulator 68, the third mass-flow controller 71, and the valve Xe-V1, and then to the mixer 70 in the xenon-adding unit 61.

The mixer 70 may mix the purified gas and the xenon-containing gas. The mixing ratio of the purified gas and the xenon-containing gas may be defined by the flow rate of the first mass-flow controller 66 and the flow rate of the third mass-flow controller 71. Mixing the xenon-containing gas with the purified gas in which xenon has been removed at a predetermined ratio may cause the laser gas having a desired xenon gas concentration to be supplied to the supply tank 62.

5.3 Process of Gas Purification Controller

Figure 20:
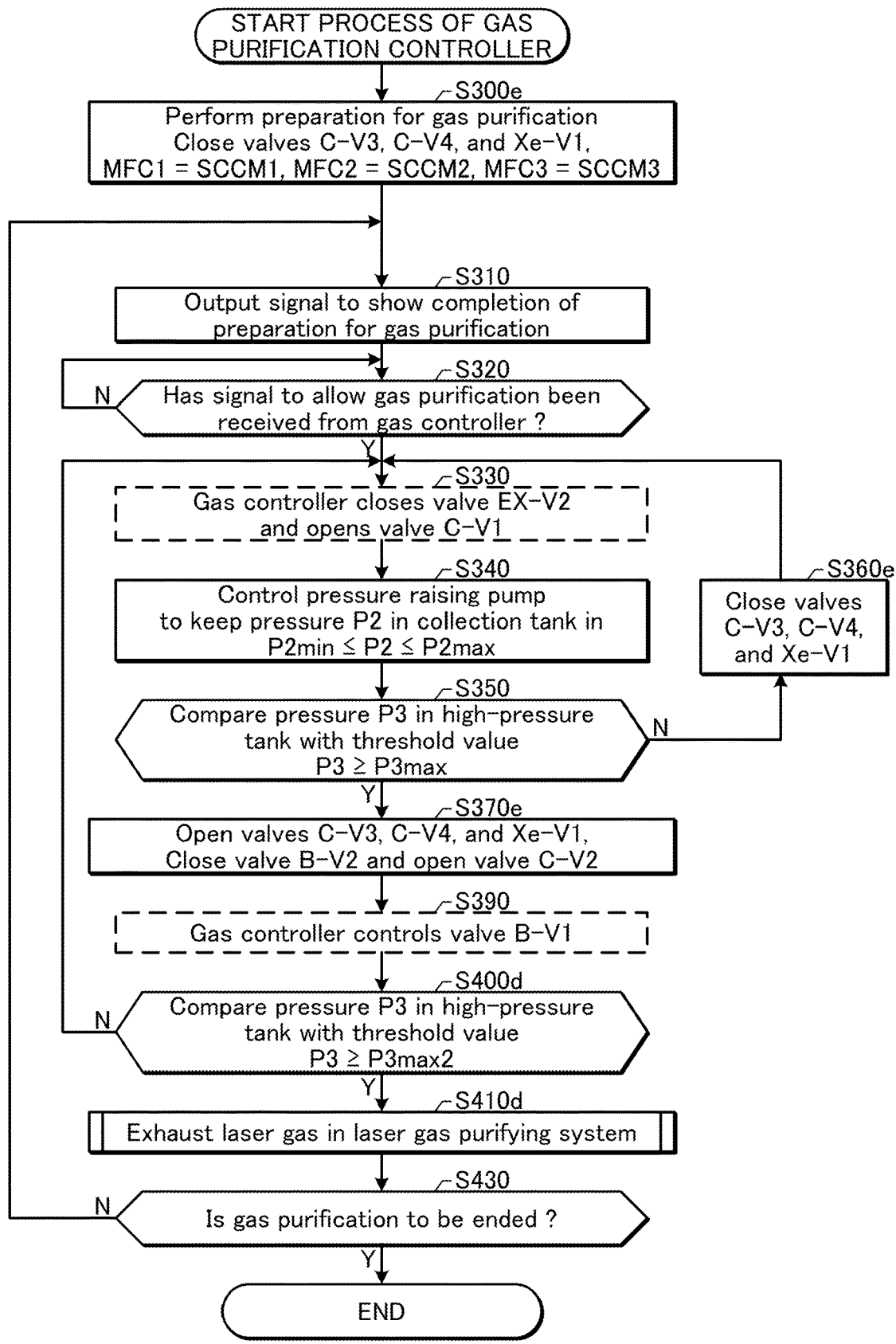
FIG. 20 is a flowchart showing a process of a gas purification controller 51 of the laser gas purifying system 50e according to the third embodiment.

FIG. 20 is a flowchart showing a process of the gas purification controller 51 of the laser gas purifying system 50e according to the third embodiment. The laser gas purifying system 50e may perform gas purification in the process executed by the gas purification controller 51 as follows.

The steps from S310 to S350 and from S390 to S430 shown in FIG. 20 may be substantially the same as described with reference to FIG. 15. The steps of S300c, 360c, and 370c in FIG. 15 may be substituted by S300e, 360e, and 370e, respectively, in FIG. 20 as follows.

In the preparation for gas purification at S300e, the gas purification controller 51 may close not only the valves C-V3 and C-V4 but also the valve Xe-V1. The gas purification controller 51 may set the flow rate MFC1 of the first mass-flow controller 66 and the flow rate MFC2 of the second mass-flow controller 69. The gas purification controller 51 may also set the flow rate MFC3 of the third mass-flow controller 71 to a constant value SCCM3.

At S360e, the gas purification controller 51 may close not only the valves C-V3 and C-V4 but also the valve Xe-V1.

At S370e, the gas purification controller 51 may open not only the valves C-V3 and C-V4 but also the valve Xe-V1. This may allow the purified gas and the xenon-containing gas to be mixed at a predetermined ratio and allow the mixed gas to be mixed with the new gas. Further, the gas purification controller 51 may close the valve B-V2 and open the valve C-V2 as in the first embodiment.

FIG. 20 describes an example where the flowchart in FIG. 15 is applied to the third embodiment. However, the present disclosure is not limited to this. For example, S400d may be substituted by a process of exhausting gas based on the cumulative amount Qsum of flow. Alternatively, a process of exhausting gas based on the value of the timer T2 may be performed. Alternatively, a process of exhausting gas based on the flag F indicating the results of the determination on the laser parameters received from the laser controller 31 may be performed. Further, a process of exhausting gas with the exhaust pump 76 to a pressure lower than the atmospheric pressure may be performed. Alternatively, a process of exhausting gas without the exhaust pump 76 to a pressure substantially equal to the atmospheric pressure may be performed.

6. Laser Gas Purifying System that Performs Gas Purge 6.1 Configuration

Figure 21:
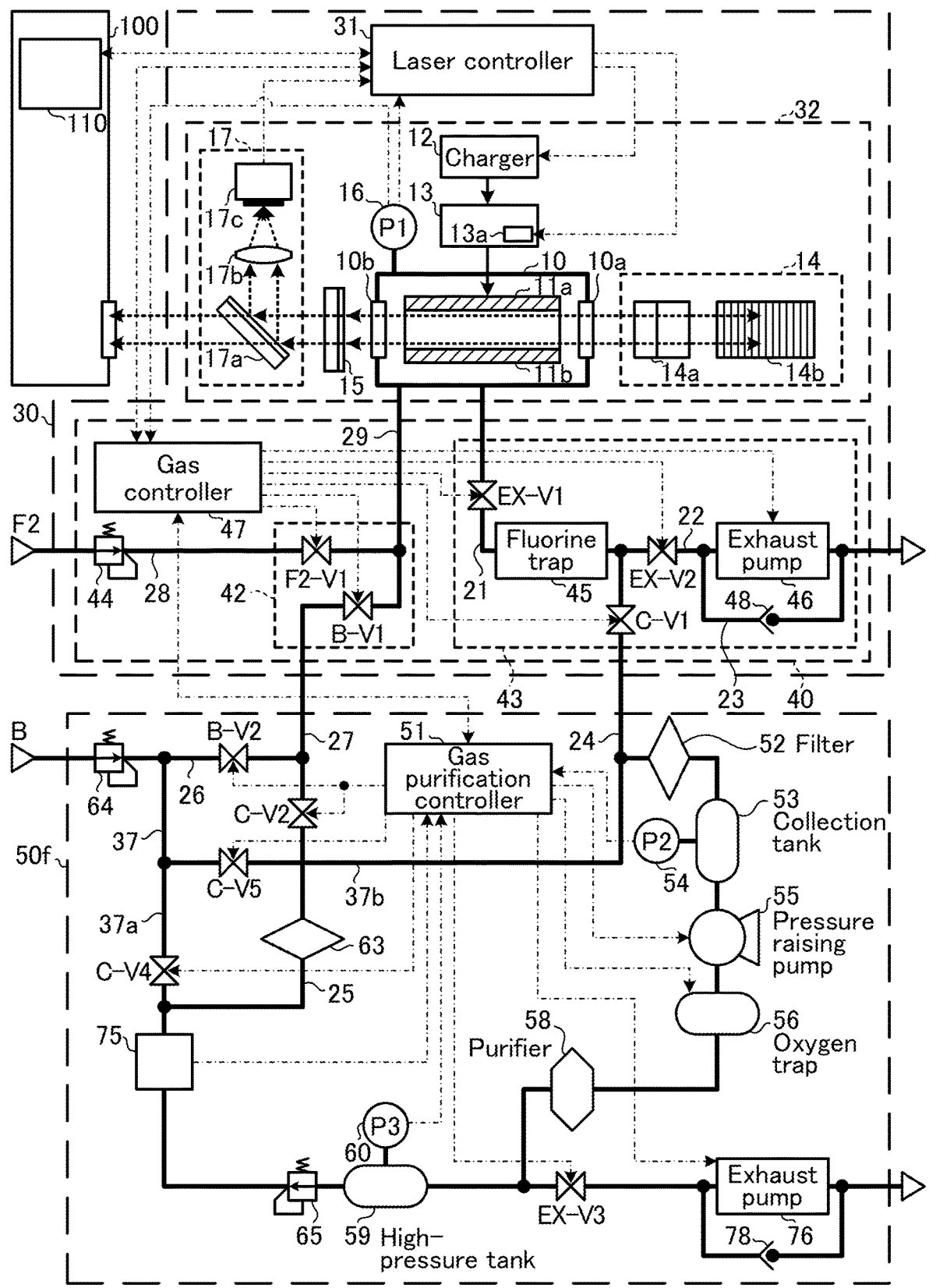
FIG. 21 schematically shows a configuration of a laser apparatus 30 and that of a laser gas purifying system 50f according to a fourth embodiment of the present disclosure.

FIG. 21 schematically shows a configuration of a laser apparatus 30 and that of a laser gas purifying system 50f according to a fourth embodiment of the present disclosure. The laser gas purifying system 50f in the fourth embodiment may include a pipe 37.

One end of the pipe 37 may be connected to the pipe 26 between the regulator 64 and the valve B-V2. The pipe 37 may be branched to a pipe 37a and a pipe 37b. The pipe 37a may be connected to the pipe 25 between the flow meter 75 and the filter 63. The valve C-V4 may be provided in the pipe 37a. The pipe 37b may be connected to the pipe 24 between the valve C-V1 and the filter 52. A valve C-V5 may be provided in the pipe 37b. The valves C-V4 and C-V5 may be controlled by the gas purification controller 51.

In other aspects, the configuration of the fourth embodiment may be substantially the same as that of the first embodiment described with reference to FIG. 4. Alternatively, the pipe 37 described above may be provided in the second or third embodiment.

6.2 Operation

Figure 22:
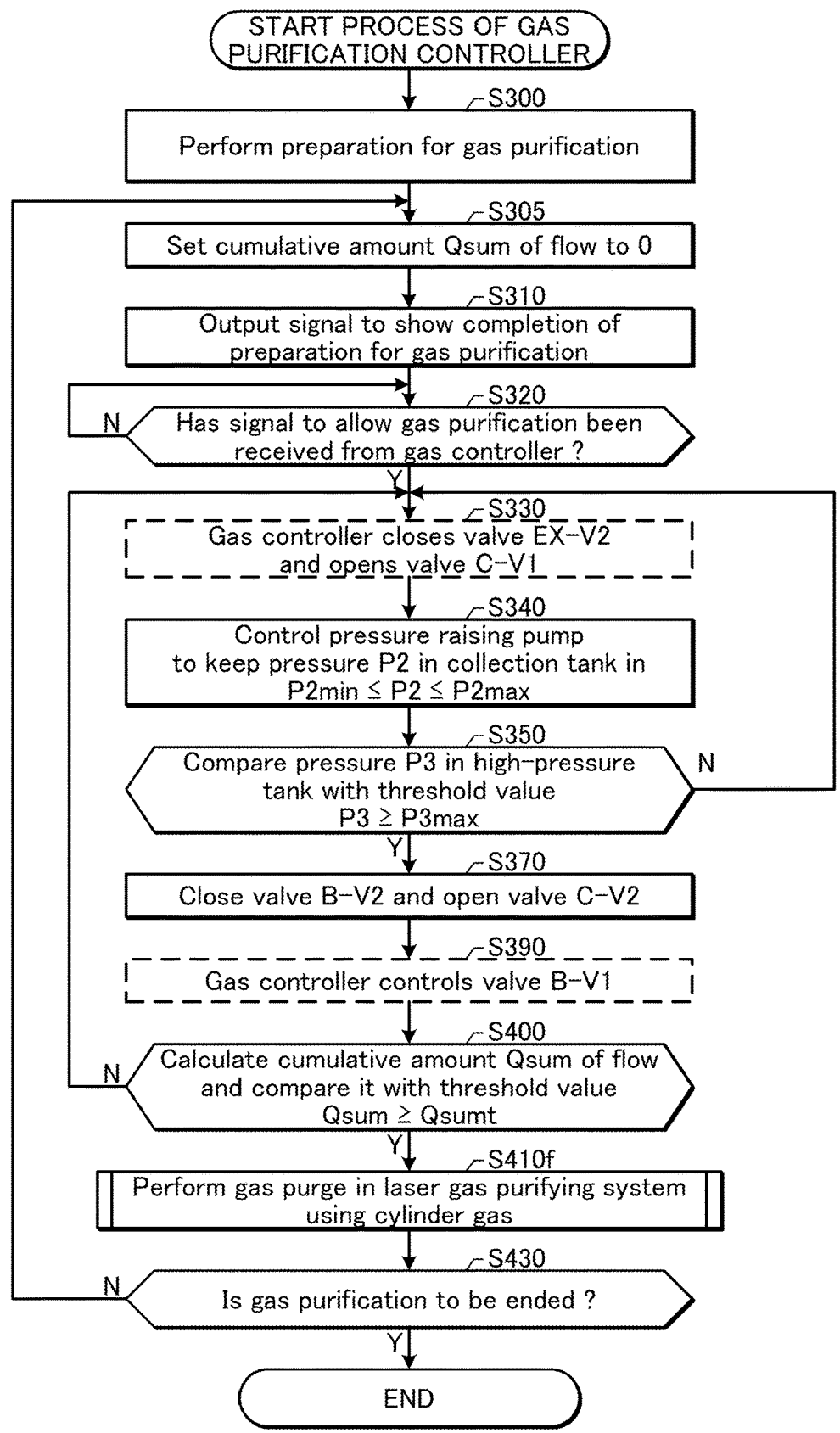
FIG. 22 is a flowchart showing a process of a gas purification controller 51 in the laser gas purifying system 50f according to the fourth embodiment.

FIG. 22 is a flowchart showing a process of the gas purification controller 51 in the laser gas purifying system 50f according to the fourth embodiment. The laser gas purifying system 50f may perform the gas purification in the process executed by the gas purification controller 51 as follows.

The steps of S300 to S400 and S430 shown in FIG. 22 may be substantially the same as described with reference to FIG. 5. The step of S410 in FIG. 5 may be substituted by S410f in FIG. 22 described below.

At S410f, the gas purification controller 51 may exhaust gas in the laser gas purifying system 50f. Also, the gas purification controller 51 may perform gas purge in the laser gas purifying system 50f using the new gas supplied from the buffer gas supply source B. In other aspects, the process in the fourth embodiment may be substantially the same as that in the first embodiment. Alternatively, the process of the gas purge in the laser gas purifying system may be performed in the second or third embodiment. Details of the process of S410f are described below with reference to FIG. 23.

Figure 23:
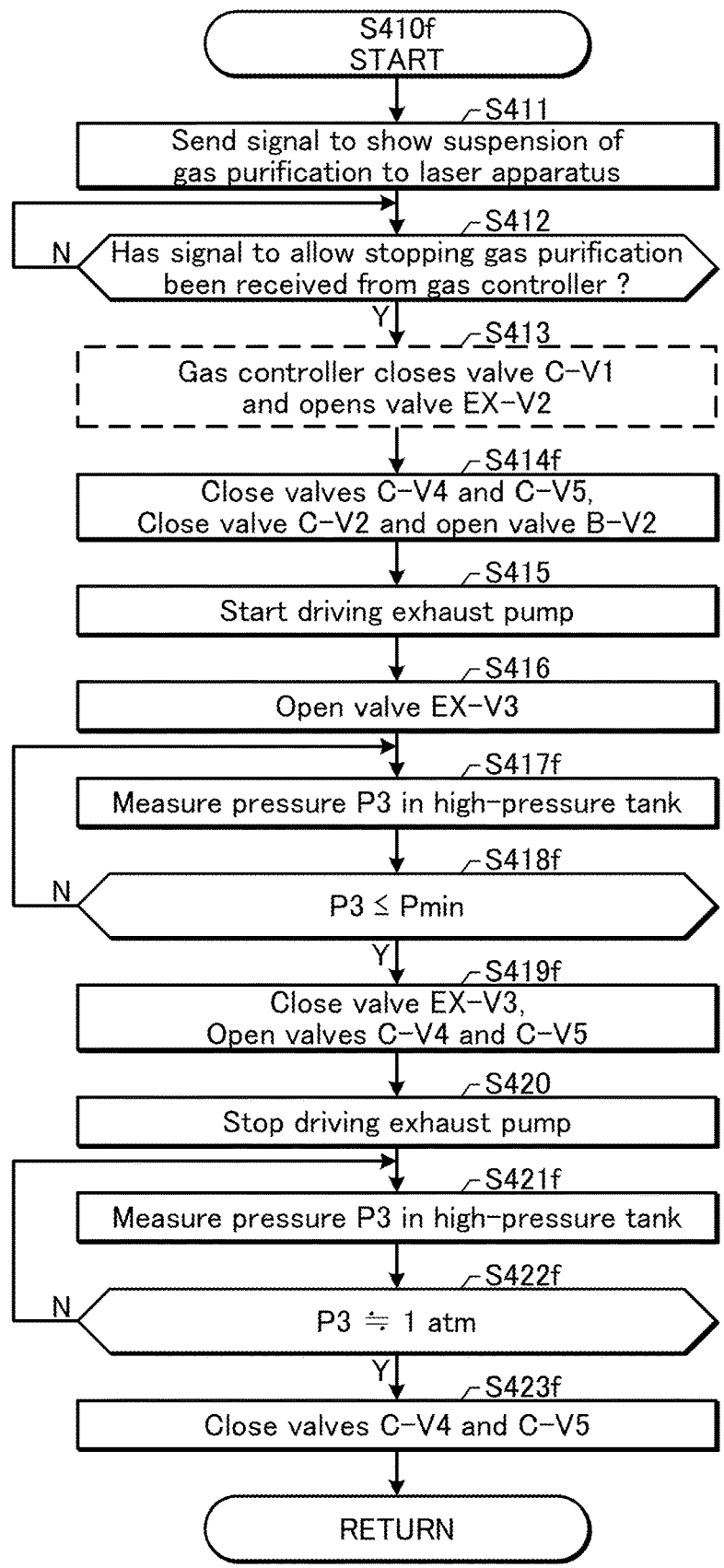
FIG. 23 is a flowchart showing details of a process of S410f shown in FIG. 22.

FIG. 23 is a flowchart showing the details of the process of S410f shown in FIG. 22. The gas purification controller 51 may exhaust laser gas in the laser gas purifying system 50f, and then perform the gas purge in the laser gas purifying system 50f as follows.

The steps of S411 to S413, S415, S416, and S420 may be substantially the same as described with reference to FIG. 6. The steps of S414, S417, S418, and S419 may be substituted in the fourth embodiment by S414f, S417f, S418f, and S419f, respectively, as follows.

At S414f, the gas purification controller 51 may close the valve C-V2 and open the valve B-V2. Also, the gas purification controller 51 may close the valves C-V4 and C-V5. The gas purification controller 51 may then exhaust gas in the gas purification flow path at S415 and S416.

At S417f, the gas purification controller 51 may measure the pressure P3 in the high-pressure tank 59. Next, at S418f, the gas purification controller 51 may compare the measured value of the pressure P3 with the threshold value Pmin. If the measured value of the pressure P3 is equal to or lower than the threshold value Pmin (S418f: YES), the gas purification controller 51 may close the valve EX-V3 at S419f to stop exhausting gas in the gas purification flow path. The gas purification controller 51 may measure both the pressure P2 in the collection tank 53 and the pressure P3 in the high-pressure tank 59 as in the first embodiment to compare them with the respective threshold values.

At S419f, the gas purification controller 51 may further open the valves C-V4 and C-V5. Then, at S420, the gas purification controller 51 may stop driving the exhaust pump 76. The gas purge in the gas purification flow path may thus be performed using the new gas supplied from the buffer gas supply source B.

Next, at S421f, the gas purification controller 51 may measure the pressure P3 in the high-pressure tank 59. Next, at S422f, the gas purification controller 51 may determine whether the measured pressure P3 is substantially equal to the atmospheric pressure. If the measured pressure P3 is substantially equal to the atmospheric pressure (S422f: YES), the gas purification controller 51 may close the valves C-V4 and C-V5 at S423f to stop the gas purge in the gas purification flow path. The gas purification controller 51 may measure both the pressure P2 in the collection tank 53 and the pressure P3 in the high-pressure tank 59 to determine whether each of them is substantially equal to the atmospheric pressure.

In the other aspects, the fourth embodiment may be substantially the same as the first embodiment. Alternatively, gas purge may be performed after exhausting gas in the other embodiment.

Figure 24:
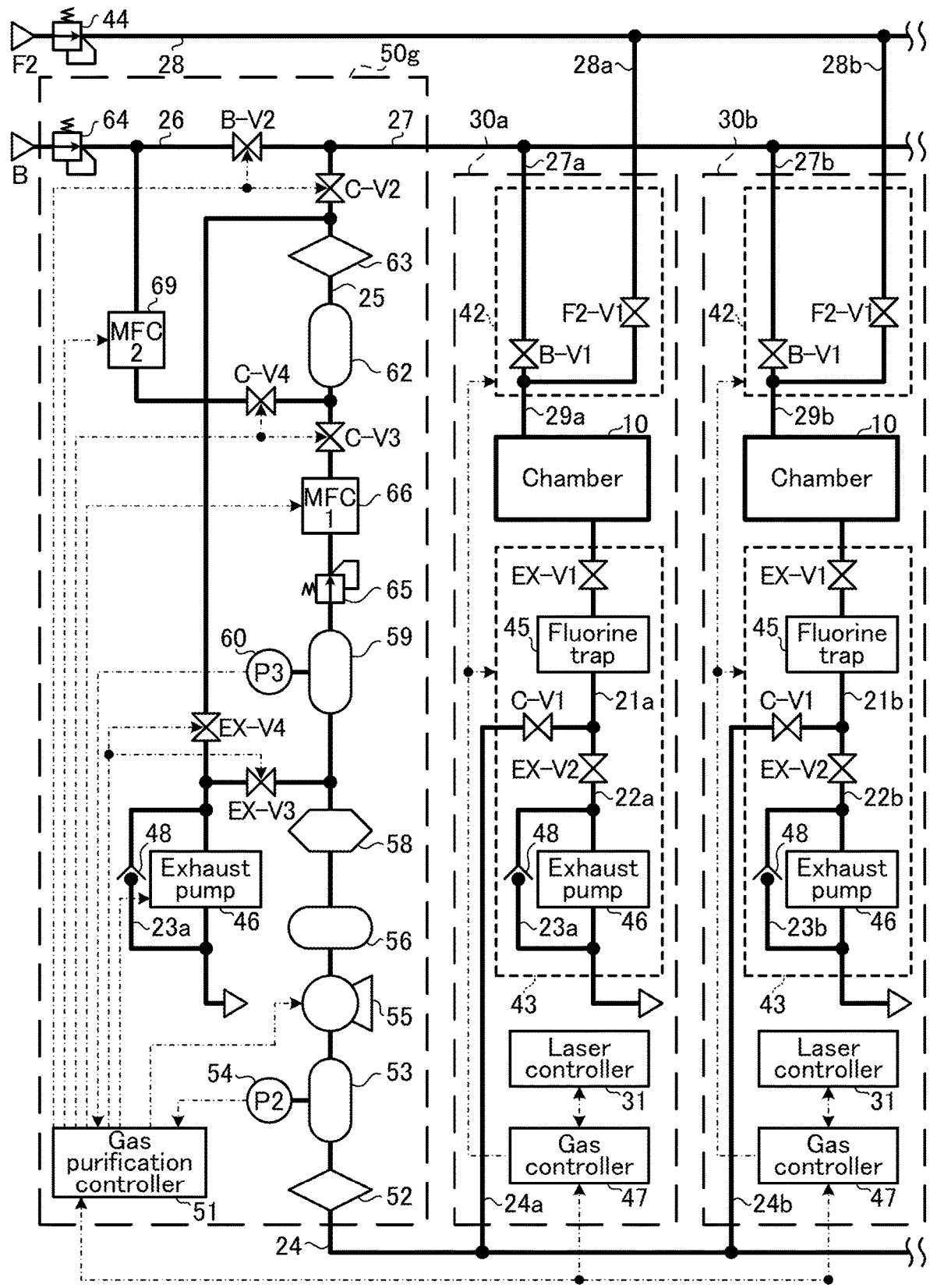
FIG. 24 schematically shows configurations of laser apparatuses 30a and 30b and a configuration of a laser gas purifying system 50g according to a fifth embodiment of the present disclosure.

7. Laser Gas Purifying System Connected to Plurality of Laser Apparatuses 7.1 Configuration FIG. 24 schematically shows configurations of laser apparatuses 30a and 30b and a configuration of a laser gas purifying system 50g according to a fifth embodiment of the present disclosure. The laser gas purifying system 50g in the fifth embodiment may be connected to a plurality of excimer laser apparatuses. The laser gas purifying system 50g may reduce impurities in the gas emitted from the excimer laser apparatuses and return purified gas in which the impurities are reduced to the excimer laser apparatuses. The configuration of each of the laser apparatuses 30a and 30b in the fifth embodiment may be substantially the same as that of the excimer laser apparatus in each of the first to fourth embodiments.

The pipe 24 in the laser gas purifying system 50g may be branched to a plurality of pipes 24a and 24b for the respective excimer laser apparatuses at a position upstream from the filter 52. The valve C-V1 may be provided in each of the pipes 24a and 24b. Opening and closing the valve C-V1 may achieve control of supplying and stopping the emission gas from the exhausting device 43 included in each of the laser apparatuses 30a and 30b to the laser gas purifying system 50g.

The pipe 27 to supply the buffer gas to the excimer laser apparatuses may be branched to a plurality of pipes 27a and 27b for the respective excimer laser apparatuses. The valve B-V1 may be provided in each of the pipes 27a and 27b. Opening and closing the valve B-V1 may achieve control of supplying and stopping the buffer gas to the gas supply device 42 included in each of the laser apparatuses 30a and 30b.

The pipe 28 to supply the fluorine-containing gas to the excimer laser apparatus may be branched to a plurality of pipes 28a and 28b for the respective excimer laser apparatuses. The valve F2-V1 may be provided in each of the pipes 28a and 28b.

Opening and closing the valve F2-V1 may achieve control of supplying and stopping the fluorine-containing gas to the gas supply device 42 included in each of the laser apparatuses 30a and 30b.

The gas purification controller 51 may be connected to the gas controller 47 included in each of the laser apparatuses 30a and 30b by a signal line shown in FIG. 24 with a dot and dash line.

In the other aspects, the configuration of the fifth embodiment may be substantially the same that of the first embodiment. Alternatively, the laser gas purifying system may be connected to a plurality of laser apparatuses in any one of the second to fourth embodiments.

7.2 Operation

Operation of each of the laser apparatuses 30a and 30b may be substantially the same as that of the excimer laser apparatus in each of the first to fourth embodiments.

The laser gas purifying system 50g may reduce impurities in the emission gas emitted from each of the laser apparatuses 30a and 30b and return purified gas in which the impurities are reduced to each of the laser apparatuses 30a and 30b. In other aspects, the operation of the laser gas purifying system 50g may be substantially the same as that of the laser gas purifying system in any one of the first to fourth embodiments.

The laser gas purifying system 50g may receive the emission gas emitted from the laser apparatuses 30a and 30b in parallel or in sequence. The laser gas purifying system 50g may supply the buffer gas to the laser apparatuses 30a and 30b in parallel or in sequence.

The laser gas purifying system 50g may supply the new gas to one laser apparatus 30a and supplies the purified gas to another laser apparatus 30b, which may be performed in sequence rather than in parallel.

7.3 Effect

According to the fifth embodiment, the laser gas purifying system 50g may purify the emission gas emitted from the excimer laser apparatuses and return the purified gas to the excimer laser apparatuses. Accordingly, an amount of consumption of inert gas and running cost may be reduced. Furthermore, a single laser gas purifying system 50g is installed for the excimer laser apparatuses, which may allow the space for installation and the equipment cost to be reduced. Gas in the laser gas purifying system 50g may be exhausted every predetermined periodic time, which may suppress accumulating the miscellaneous impurities that are not removed in the laser gas purifying system 50g.

8. Laser Gas Purifying System Capable of Changing Gas Supplied to Each Laser

8.1 Configuration

Figure 25:
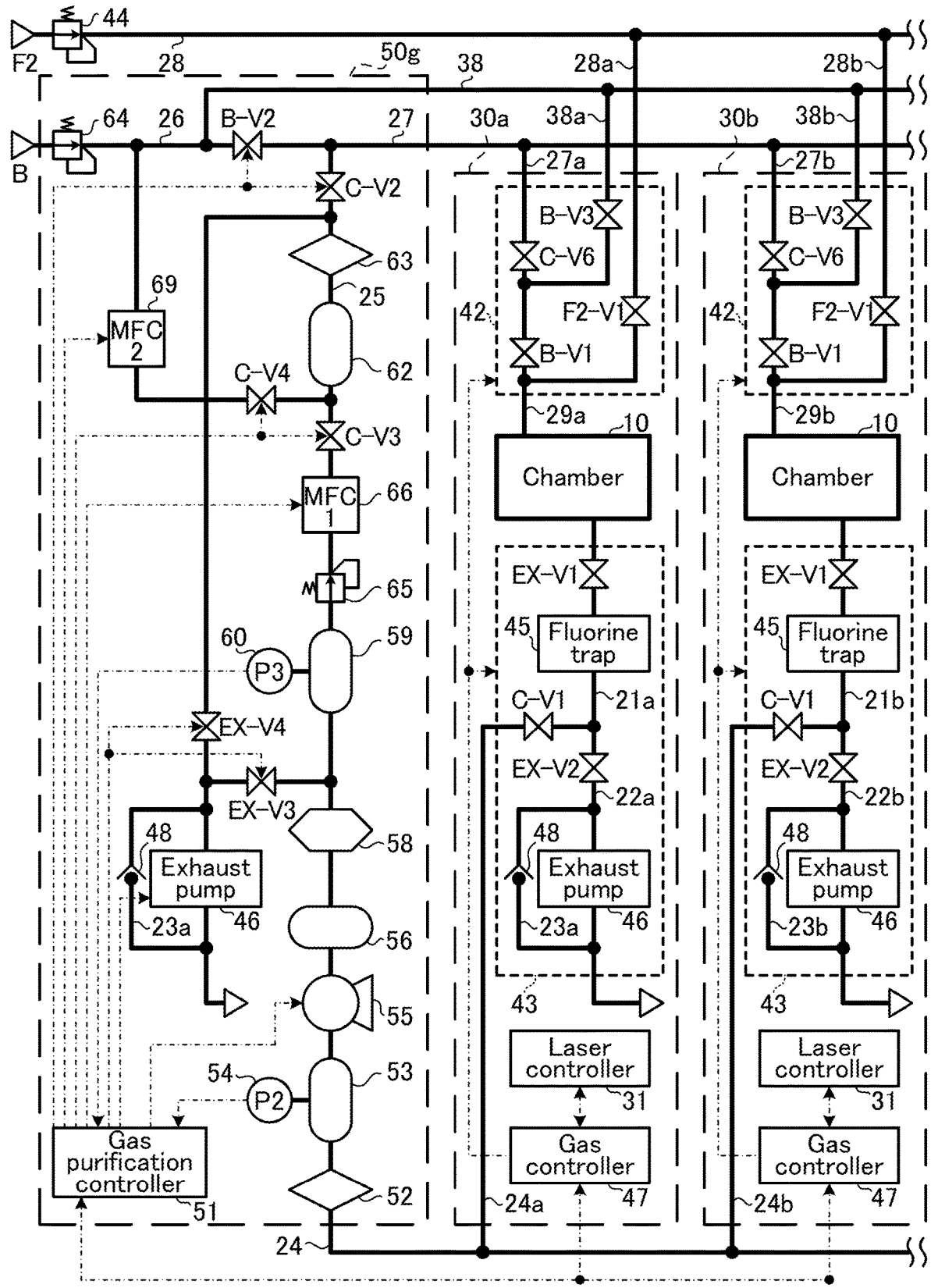
FIG. 25 schematically shows configurations of laser apparatuses 30a and 30b and a configuration of a laser gas purifying system 50g according to a sixth embodiment of the present disclosure.

FIG. 25 schematically shows configurations of laser apparatuses 30a and 30b and a configuration of a laser gas purifying system 50g according to a sixth embodiment of the present disclosure. In the sixth embodiment, a pipe 38 for new gas connected to the buffer gas supply source B may be provided in addition to the pipe 27 for supplying the buffer gas to the excimer laser apparatuses. The pipe 38 for new gas may be connected to the pipe 26 between the regulator 64 and the valve B-V2.

The pipe 38 for new gas may be branched to a plurality of pipes 38a and 38b for the respective excimer laser apparatuses. A valve B-V3 may be provided in each of the pipes 38a and 38b. The pipes 38a and 38b may be connected to the pipes 27a and 27b, respectively. A valve C-V6 may be provided in the pipe 27a upstream from the connecting portion of the pipe 27a and the pipe 38a. Another valve C-V6 may be provided in the pipe 27b upstream from the connecting portion of the pipe 27b and the pipe 38b. A valve B-V1 may be provided in the pipe 27a downstream from the connecting portion of the pipe 27a and the pipe 38a. Another valve B-V1 may be provided in the pipe 27b downstream from the connecting portion of the pipe 27b and the pipe 38b.

In other aspects, the configuration of the sixth embodiment may be substantially the same as that of the fifth embodiment.

8.2 Operation

The pipe 27 may supply the new gas or the purified gas selected according to the control of the valve B-V2 and the valve C-V2 by the laser gas purifying system 50g. In contrast, the pipe 38 for new gas may supply the new gas regardless of the control by the laser gas purifying system 50g.

The valve B-V3 and the valve C-V6 in each of the laser apparatuses may be controlled by the gas controller 47. Alternatively, the valve B-V3 and the valve C-V6 may be controlled by a control signal from an unillustrated factory managing system or the exposure apparatus. Alternatively, the valve B-V3 and the valve C-V6 may be controlled by an operator using an unillustrated input device. If the valve B-V3 is closed and the valve C-V6 is open in one laser apparatus, the purified gas or the new gas selected by the laser gas purifying system 50g may be supplied via the pipe 27 to the laser apparatus. If the valve B-V3 is open and the valve C-V6 is closed in another laser apparatus, the new gas may be supplied regardless of the control by the laser gas purifying system 50g via the pipe 38 for new gas to the laser apparatus.

There may be a need, for example, to evaluate the performance of one laser apparatus of the laser apparatuses 30a and 30b. In that case, the gas controller 47 in the laser apparatus may open the valve B-V3 and close the valve C-V6. This may achieve evaluating the performance of the laser apparatus itself by eliminating the possibility where the quality of the laser beam is influenced by the impurities included in the purified gas.

There may be another need, for example, to improve quality of the laser beam outputted from one laser apparatus of the laser apparatuses 30a and 30b. There may be still another need, for example, to continue to use one laser apparatus of the laser apparatuses 30a and 30b until the day for the next maintenance in spite of the end of the lifetime. In those cases, the gas controller 47 in the laser apparatus may open the valve B-V3 and close the valve C-V6.

In the sixth embodiment, the buffer gas to be supplied to the chamber 10 is capable of being switched for each laser apparatus. However, the present disclosure is not limited to this. Supplying the emission gas emitted from the chamber 10 to the laser gas purifying system 50g or exhausting the emission gas to the outside of the exhausting device may be selected for each laser apparatus.

For example, there may be a case where the emission gas emitted from one laser apparatus, of the laser apparatuses 30a and 30b, is supposed to include a large amount of impurities. In that case, the gas controller 47 in the laser apparatus may close the valve C-V1 and open the valve EX-V2.

Figure 26:
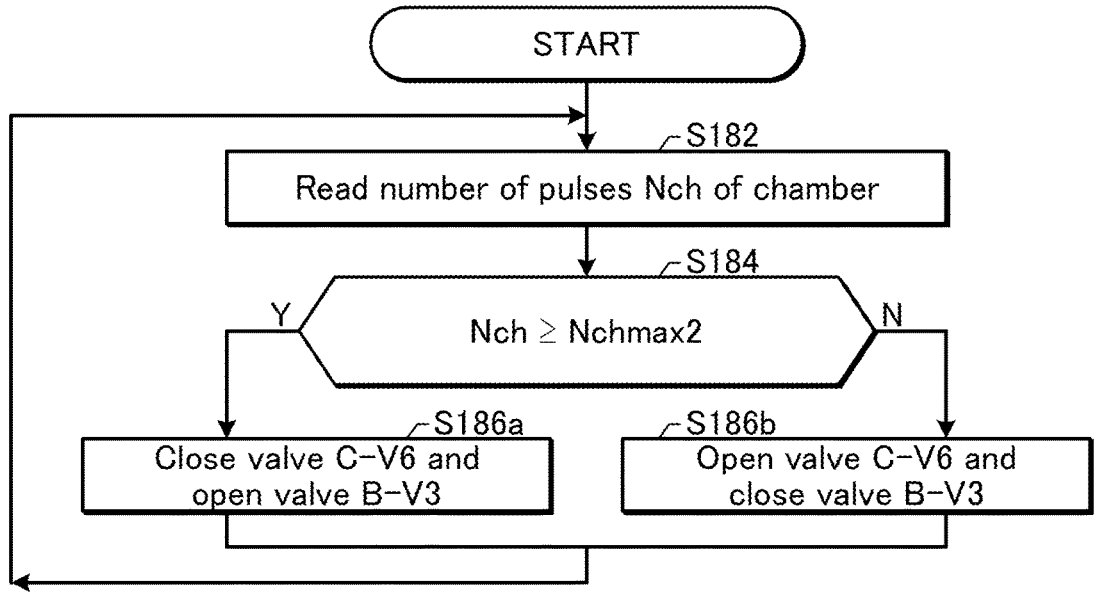
FIG. 26 is a flowchart showing a first example of a process of a gas controller 47 in one of the laser apparatuses 30a and 30b according to the sixth embodiment.

FIG. 26 is a flowchart showing a first example of a process of the gas controller 47 in one of the laser apparatuses 30a and 30b according to the sixth embodiment. Each of the laser apparatuses may perform gas switching process executed by the gas controller 47 as follows.

The process shown in FIG. 26 may be executed if the laser gas purifying system has completed its preparation at S160 described above with reference to FIG. 2.

First, at S182, the gas controller 47 may read a value of the number of pulses Nch of the chamber. The number of pulses Nch of the chamber may be the number of pulses outputted since the chamber 10 was installed.

Next, at S184, the gas controller 47 may determine whether the number of pulses Nch of the chamber is equal to or larger than a threshold value Nchmax2. The threshold value Nchmax2 may be a value where it is supposed that the end of the lifetime has come for the chamber.

If the number of pulses Nch of the chamber is less than the threshold value Nchmax2 (S184: NO), the gas controller 47 may open the valve C-V6 and close the valve B-V3 at S186b. The chamber may thus receive the laser gas supplied from the laser gas purifying system 50g until the end of the lifetime of the chamber.

If the number of pulses Nch of the chamber is equal to or larger than the threshold value Nchmax2 (S184: YES), the gas controller 47 may close the valve C-V6 and open the valve B-V3 at S186a. Even if the number of pulses reaches a value corresponding to the end of the lifetime of the chamber, the new gas may be supplied to the chamber regardless of the control of the laser gas purifying system 50g until the laser controller 31 stops the operation of the laser.

Until the laser controller 31 stops the operation of the laser, this control may be repeated.

Unless the emission gas has a problem, the valve C-V1 may be kept open and the valve EX-V2 may be kept closed at any one of S186*b* and S186*a*.

Figure 27:
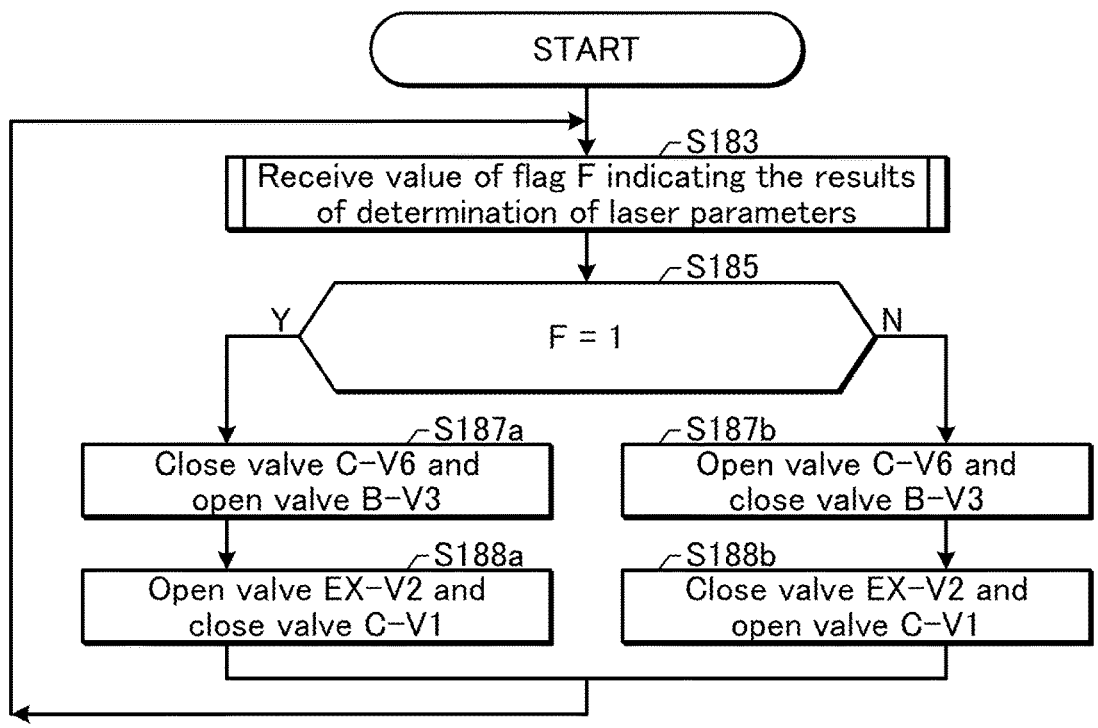
FIG. 27 is a flowchart showing a second example of the process of the gas controller 47 in one of the laser apparatuses 30a and 30b according to the sixth embodiment.

FIG. 27 is a flowchart showing a second example of a process of the gas controller 47 in one of the laser apparatuses 30*a* and 30*b* according to the sixth embodiment. Each of the laser apparatuses may perform gas switching process executed by the gas controller 47 as follows.

The process shown in FIG. 27 may be executed if the laser gas purifying system has completed its preparation at S160 described above with reference to FIG. 2.

First, at S183, the gas controller 47 may receive a flag F indicating the results of the determination of the laser parameters from the laser controller 31. The flag F indicating the results of the determination of the laser parameters is described below with reference to FIG. 28.

Next, at S185, the gas controller 47 may determine whether the value of the flag F indicating the results of the determination of the laser parameters is 1. If the value of the flag F indicating the results of the determination of the laser parameters is 1, it may be supposed that the emission gas from the chamber 10 in the laser apparatus includes a large amount of impurities.

If the value of the flag F is not 1 (S185: NO), the gas controller 47 may open the valve C-V6 and close the valve B-V3 at S187*b*. The chamber may thus receive the laser gas supplied from the laser gas purifying system 50*g*.

The gas controller 47 may also open the valve C-V1 and close the valve EX-V2 at S188*b*. The emission gas emitted from the chamber of the laser apparatus may thus be supplied to the laser gas purifying system 50*g*.

If the value of the flag F is 1 (S185: YES), the gas controller 47 may close the valve C-V6 and open the valve B-V3 at S187*a*. The new gas may thus be supplied to the chamber regardless of the control of the laser gas purifying system 50*g*.

The gas controller 47 may also close the valve C-V1 and open the valve EX-V2 at S188*a*. The emission gas from the chamber of the laser apparatus may thus be exhausted to the outside of the exhausting device, without supplying it to the laser gas purifying system 50*g*.

Until the laser controller 31 stops the operation of the laser, this control may be repeated.

Figure 28:
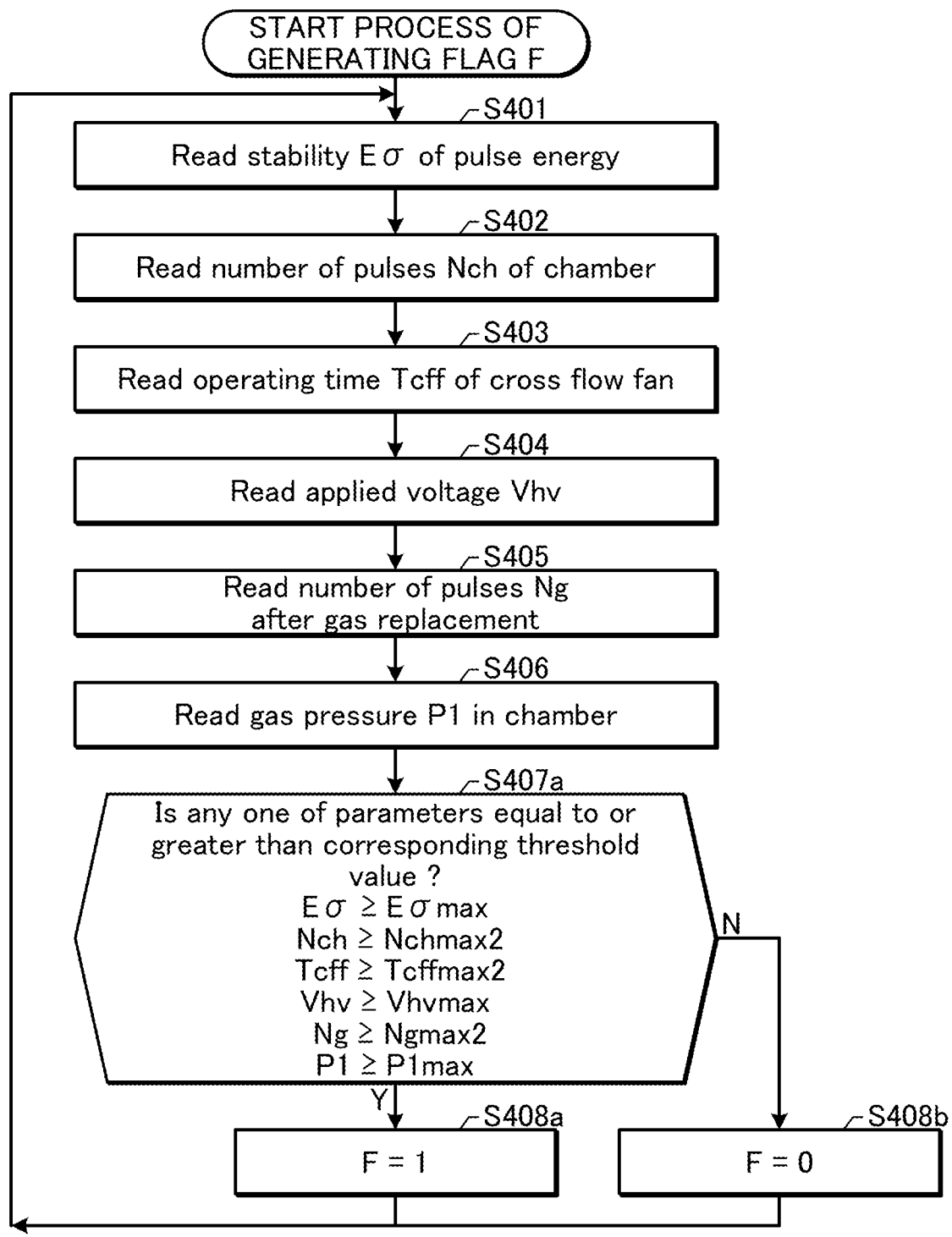
FIG. 28 is a flowchart showing a process of generating a flag F in the second example of the process of the gas controller 47 in the sixth embodiment.

FIG. 28 is a flowchart showing a process of generating the flag F in the second example of the process of the gas controller 47 in the sixth embodiment. The laser controller 31 may generate the flag F as follows.

The steps from S401 to S406 may be substantially the same as described with reference to FIG. 11.

At S407*a*, the laser controller 31 may determine whether any one of the parameters described above is equal to or greater than a corresponding threshold value. This process may be substantially the same as S407 described with reference to FIG. 11. However, the set of the threshold values in FIG. 28 may be slightly different from that in FIG. 11. The threshold value of the number of pulses Nch of the chamber at S407*a* may be Nchmax2. The threshold value of the operating time Tcff of the cross flow fan may be Tcffmax2. The threshold value of the number of pulses Ng after gas replacement may be Ngmax2. Each of the threshold values Nchmax2, Tcffmax2, and Ngmax2 may be a value where it is supposed that the end of the lifetime has come for the chamber.

If any one of the parameters is equal to or greater than the corresponding threshold value (S407*a*: YES), the laser controller 31 may set the flag F to 1 at S408*a*.

If none of the parameters is equal to or greater than the corresponding threshold value (S407*a*: NO), the laser controller 31 may set the flag F to 0 at S408*b*.

After S408*a* or S408*b*, the laser controller 31 may return to S401 to repeat the process described above.

9. Configuration of Controller

Figure 29:
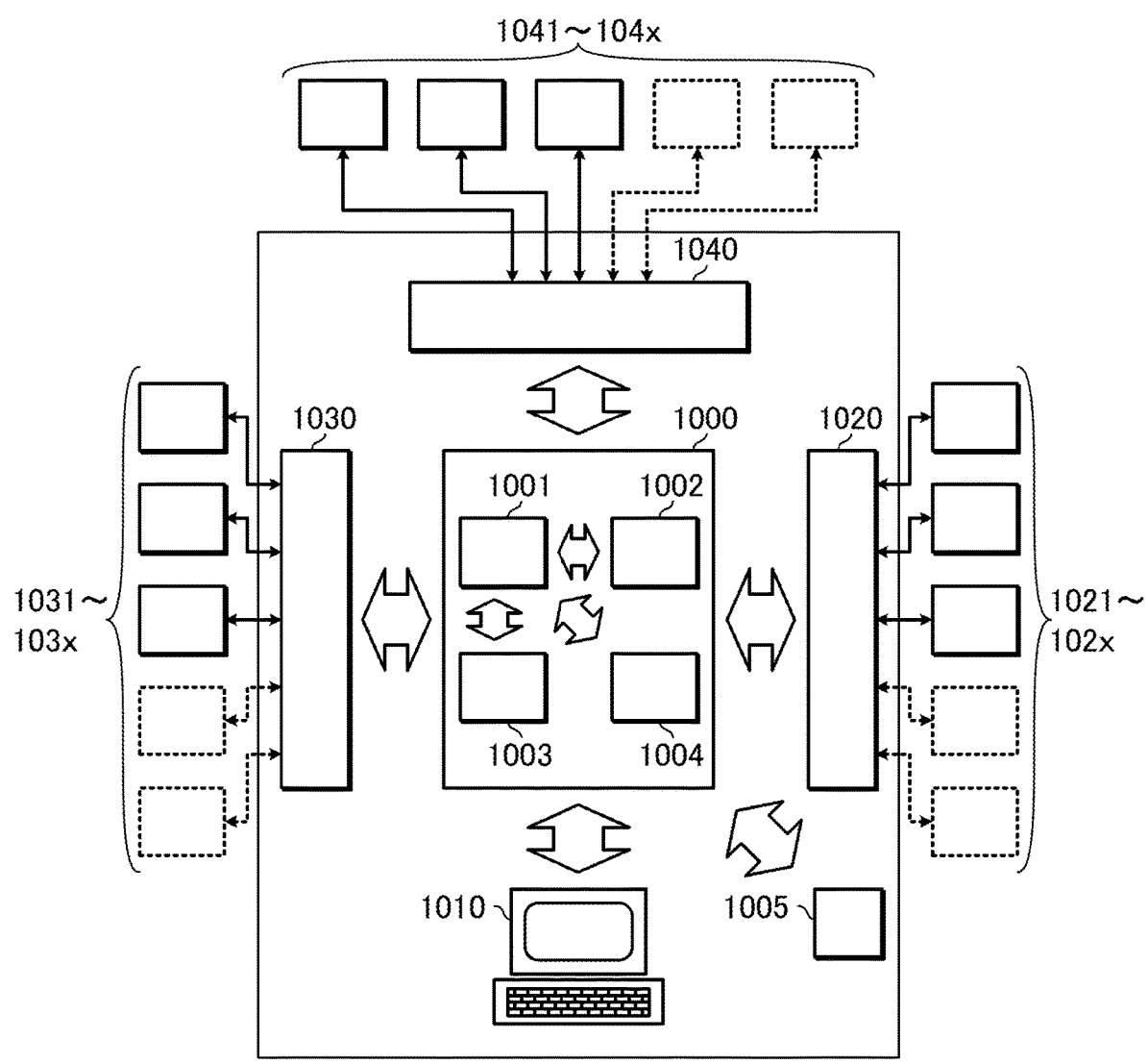
FIG. 29 is a block diagram showing a general configuration of a controller.

FIG. 29 is a block diagram showing a general configuration of the controller.

Controllers of the above-described embodiments, such as the gas purification controller 51, may be configured by general-purpose control devices, such as computers or programmable controllers. For example, the controllers may be configured as follows.

Configuration

The controllers may each be configured by a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may be configured by a central processing unit (CPU) 1001, and a memory 1002, a timer 1003, and a graphics processing unit (GPU) 1004 which are connected to the CPU 1001.

Operation

The processor 1000 may read a program stored in the storage memory 1005, execute the read program, read data from the storage memory 1005 in accordance with the program, or store data in the storage memory 1005.

The parallel I/O controller 1020 may be connected to devices 1021 to 102*x* with which it may communicate through parallel I/O ports. The parallel I/O controller 1020 may control digital-signal communication through the parallel I/O ports while the processor 1000 executes the program.

The serial I/O controller 1030 may be connected to devices 1031 to 103*x* with which it may communicate through serial I/O ports. The serial I/O controller 1030 may control digital-signal communication through the serial I/O ports while the processor 1000 executes the program.

The A/D and D/A converter 1040 may be connected to devices 1041 to 104*x* with which it may communicate through analog ports.

The A/D and D/A converter 1040 may control analog-signal communication through the analog ports while the processor 1000 executes the program.

The user interface 1010 may be configured to display the progress of the program being executed by the processor 1000 in accordance with instructions from an operator, or to allow the processor 1000 to stop the execution of the program or perform an interrupt in accordance with instructions from the operator.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time and output it to the CPU 1001 in accordance with the program being executed. When image data is inputted to the processor 1000, the GPU 1004 may process the image data in accordance with the program being executed and output the results to the CPU 1001.

The devices 1021 to 102x, which are connected through the parallel I/O ports to the parallel I/O controller 1020, may be the laser apparatus 30, the exposure apparatus 100, other controllers, or the like.

The devices 1031 to 103x, which are connected through the serial I/O ports to the serial I/O controller 1030, may be the first or second mass-flow controller 66 or 69, or the like.

The devices 1041 to 104x, which are connected through the analog ports to the A/D and D/A converter 1040, may be various sensors such as the pressure sensor 54 or 60, or the like.

The controllers thus configured may be capable of realizing the operations described in the embodiments.

The above descriptions are intended to be only illustrative rather than being limiting. Accordingly, it will be clear to those skilled in the art that various changes may be made to the embodiments of the present disclosure without departing from the scope of the appended claims.

The terms used in this specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or "an" as used in this specification and the appended claims should be interpreted as meaning "at least one" or "one or more".

The invention claimed is:

1. A laser gas purifying system configured to purify laser gas emitted from a laser apparatus and return purified gas to the laser apparatus, comprising:
   a first pipe configured to pass the laser gas emitted from the laser apparatus;
   a purifying apparatus connected to the first pipe and configured to purify the laser gas emitted from the laser apparatus;
   a second pipe connected to the purifying apparatus and configured to return the purified gas purified by the purifying apparatus to the laser apparatus;
   a first exhaust pump connected to the purifying apparatus;
   a first valve provided in the first pipe;
   a second valve provided in the second pipe; and
   a gas purification controller configured to control the first exhaust pump, with the first and second valves closed, to exhaust the laser gas in the purifying apparatus based on at least one of
      a cumulative amount of flow of the laser gas passed through the purifying apparatus,
      a stability in pulse energy of the laser apparatus, and
      an applied voltage applied to a pair of discharge electrodes of the laser apparatus,
   wherein the first valve is configured to pass the laser gas emitted from the laser apparatus when the first valve is open.

2. The laser gas purifying system according to claim 1, further comprising:
   a gas cylinder storing laser gas; and
   a third pipe connected between a gas purification flow path and the gas cylinder, the gas purification flow path including the first pipe, the purifying apparatus, and the second pipe.

3. The laser gas purifying system according to claim 2, further comprising:
   a first flow rate adjusting unit provided in the gas purification flow path, the first flow rate adjusting unit being provided upstream from a connecting portion connecting the gas purification flow path and the third pipe; and
   a second flow rate adjusting unit provided in the third pipe.

4. The laser gas purifying system according to claim 3, further comprising:
   a first tank provided in the gas purification flow path, the first tank being provided upstream from the first flow rate adjusting unit; and
   a second tank provided in the gas purification flow path, the second tank being provided downstream from the connecting portion.

5. The laser gas purifying system according to claim 1, wherein the first exhaust pump is driven when the cumulative amount of flow of the laser gas is equal to or greater than a threshold value.

6. The laser gas purifying system according to claim 1, wherein the first exhaust pump is driven when the stability in pulse energy is equal to or greater than a threshold value.

7. The laser gas purifying system according to claim 1, wherein the first exhaust pump is driven when the applied voltage is equal to or greater than a threshold value.

8. The laser gas purifying system according to claim 1, further comprising
   a second exhaust pump connected to the first pipe, wherein
   the first exhaust pump is connected to one of the purifying apparatus and the second pipe, the purifying apparatus and the second pipe being positioned downstream of the laser gas from the first pipe.

\* \* \* \* \*